(12) United States Patent
Gupta et al.

(10) Patent No.: US 10,919,458 B2
(45) Date of Patent: Feb. 16, 2021

(54) METHOD AND SYSTEM FOR CALIBRATING VEHICULAR CAMERAS

(71) Applicant: MAGNA ELECTRONICS INC., Auburn Hills, MI (US)

(72) Inventors: Nikhil Gupta, Brampton (CA); Hilda Faraji, Toronto (CA); Daan He, Toronto (CA); Ghanshyam Rathi, Mississauga (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/929,700

(22) Filed: May 18, 2020

(65) Prior Publication Data

US 2020/0276939 A1 Sep. 3, 2020

Related U.S. Application Data

(63) Continuation of application No. 15/830,116, filed on Dec. 4, 2017, now Pat. No. 10,654,423, which is a
(Continued)

(51) Int. Cl.
*B60R 11/04* (2006.01)
*G06T 7/80* (2017.01)
(Continued)

(52) U.S. Cl.
CPC .............. *B60R 11/04* (2013.01); *G03B 43/00* (2013.01); *G06T 3/4038* (2013.01); *G06T 7/80* (2017.01);
(Continued)

(58) Field of Classification Search
CPC ................ G06T 3/4038; B60R 11/04
See application file for complete search history.

(56) References Cited

U.S. PATENT DOCUMENTS 4,967,319 A 10/1990 Seko
4,970,653 A 11/1990 Kenue
(Continued)

FOREIGN PATENT DOCUMENTS

EP 0361914 A2 4/1990
EP 0640903 A1 3/1995
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — William C Vaughn, Jr.
*Assistant Examiner* — Jerry Jean Baptiste
(74) *Attorney, Agent, or Firm* — Honigman LLP

(57) ABSTRACT

A method for calibrating a vehicular camera includes providing at least a front or rear camera and a side camera with overlapping fields of view, and calibrating the front or rear camera, capturing a calibrated frame of image data with the front or rear camera, and capturing a sideward frame of image data with a side camera. At least one feature is determined present in the overlapping region of the calibrated frame, and pixel positions of the determined feature are predicted for the side camera. Misalignment of the side camera is determined based on a comparison of the predicted pixel positions of the determined feature to the pixel positions of the determined feature in the sideward frame of image data captured by the side camera. Processing of image data captured by the side camera is adjusted to accommodate the determined misalignment.

21 Claims, 32 Drawing Sheets

Related U.S. Application Data continuation of application No. 14/113,412, filed as application No. PCT/CA2012/000378 on Apr. 25, 2012, now Pat. No. 9,834,153.

(60) Provisional application No. 61/540,256, filed on Sep. 28, 2011, provisional application No. 61/478,711, filed on Apr. 25, 2011.

(51) Int. Cl.
    *G03B 43/00*      (2021.01)
    *G06T 3/40*      (2006.01)
    *H04N 17/00*      (2006.01)

(52) U.S. Cl.
    CPC .............. *G06T 7/85* (2017.01); *H04N 17/002* (2013.01); *B60R 2300/105* (2013.01); *B60R 2300/303* (2013.01); *G06T 2207/30252* (2013.01)

(56) References Cited

U.S. PATENT DOCUMENTS

| | | |
|---|---|---|
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,166,681 A | 11/1992 | Bottesch et al. |
| 5,177,606 A | 1/1993 | Koshizawa |
| 5,182,502 A | 1/1993 | Slotkowski et al. |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,593,960 B1 | 7/2003 | Sugimoto et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,744,353 B2 | 6/2004 | Sjonell |
| 6,762,867 B2 | 7/2004 | Lippert et al. |
| 6,795,221 B1 | 9/2004 | Urey |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |
| 6,864,930 B2 | 3/2005 | Matsushita et al. |
| 6,889,161 B2 | 5/2005 | Winner et al. |
| 6,909,753 B2 | 6/2005 | Meehan et al. |
| 6,946,978 B2 | 9/2005 | Schofield |

(56) References Cited

U.S. PATENT DOCUMENTS

| | | | |
|---|---|---|---|
| 6,968,736 B2 | 11/2005 | Lynam | |
| 6,975,775 B2 | 12/2005 | Rykowski et al. | |
| 7,004,606 B2 | 2/2006 | Schofield | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,085,637 B2 | 8/2006 | Breed et al. | |
| 7,092,548 B2 | 8/2006 | Laumeyer et al. | |
| 7,113,867 B1 | 9/2006 | Stein | |
| 7,116,246 B2 | 10/2006 | Winter et al. | |
| 7,123,168 B2 | 10/2006 | Schofield | |
| 7,133,661 B2 | 11/2006 | Hatae et al. | |
| 7,149,613 B2 | 12/2006 | Stam et al. | |
| 7,151,996 B2 | 12/2006 | Stein | |
| 7,167,796 B2 | 1/2007 | Taylor et al. | |
| 7,195,381 B2 | 3/2007 | Lynam et al. | |
| 7,202,776 B2 | 4/2007 | Breed | |
| 7,227,459 B2 | 6/2007 | Bos et al. | |
| 7,227,611 B2 | 6/2007 | Hull et al. | |
| 7,325,934 B2 | 2/2008 | Schofield et al. | |
| 7,325,935 B2 | 2/2008 | Schofield et al. | |
| 7,338,177 B2 | 3/2008 | Lynam | |
| 7,375,803 B1 | 5/2008 | Bamji | |
| 7,380,948 B2 | 6/2008 | Schofield et al. | |
| 7,388,182 B2 | 6/2008 | Schofield et al. | |
| 7,423,821 B2 | 9/2008 | Bechtel et al. | |
| 7,526,103 B2 | 4/2009 | Schofield et al. | |
| 7,541,743 B2 | 6/2009 | Salmeen et al. | |
| 7,565,006 B2 | 7/2009 | Stam et al. | |
| 7,566,851 B2 | 7/2009 | Stein et al. | |
| 7,605,856 B2 | 10/2009 | Imoto | |
| 7,619,508 B2 | 11/2009 | Lynam et al. | |
| 7,720,580 B2 | 5/2010 | Higgins-Luthman | |
| 7,786,898 B2 | 8/2010 | Stein et al. | |
| 7,792,329 B2 | 9/2010 | Schofield et al. | |
| 7,843,451 B2 | 11/2010 | Lafon | |
| 7,855,778 B2 | 12/2010 | Yung et al. | |
| 7,881,496 B2 | 2/2011 | Camilleri et al. | |
| 7,930,160 B1 | 4/2011 | Hosagrahara et al. | |
| 7,949,486 B2 | 5/2011 | Denny et al. | |
| 8,017,898 B2 | 9/2011 | Lu et al. | |
| 8,064,643 B2 | 11/2011 | Stein et al. | |
| 8,082,101 B2 | 12/2011 | Stein et al. | |
| 8,164,628 B2 | 4/2012 | Stein et al. | |
| 8,224,031 B2 | 7/2012 | Saito | |
| 8,233,045 B2 | 7/2012 | Luo et al. | |
| 8,254,635 B2 | 8/2012 | Stein et al. | |
| 8,300,886 B2 | 10/2012 | Hoffmann | |
| 8,373,763 B2 | 2/2013 | Zhang et al. | |
| 8,378,851 B2 | 2/2013 | Stein et al. | |
| 8,421,865 B2 | 4/2013 | Euler et al. | |
| 8,452,055 B2 | 5/2013 | Stein et al. | |
| 8,553,088 B2 | 10/2013 | Stein et al. | |
| 9,264,672 B2 | 2/2016 | Lynam | |
| 9,834,153 B2 | 12/2017 | Gupta et al. | |
| 10,654,423 B2 | 5/2020 | Gupta et al. | |
| 2002/0005778 A1 | 1/2002 | Breed et al. | |
| 2002/0011611 A1 | 1/2002 | Huang et al. | |
| 2002/0113873 A1 | 8/2002 | Williams | |
| 2003/0103142 A1 | 6/2003 | Hitomi et al. | |
| 2003/0137586 A1 | 7/2003 | Lewellen | |
| 2003/0222982 A1 | 12/2003 | Hamdan et al. | |
| 2004/0164228 A1 | 8/2004 | Fogg et al. | |
| 2005/0090957 A1 | 4/2005 | Luo et al. | |
| 2005/0219852 A1 | 10/2005 | Stam et al. | |
| 2005/0237385 A1 | 10/2005 | Kosaka et al. | |
| 2006/0050018 A1 | 3/2006 | Hutzel et al. | |
| 2006/0091813 A1 | 5/2006 | Stam et al. | |
| 2006/0103727 A1 | 5/2006 | Tseng | |
| 2006/0250501 A1 | 11/2006 | Wildmann et al. | |
| 2007/0024724 A1 | 2/2007 | Stein et al. | |
| 2007/0104476 A1 | 5/2007 | Yasutomi et al. | |
| 2007/0165909 A1 | 7/2007 | Leleve et al. | |
| 2007/0242339 A1 | 10/2007 | Bradley | |
| 2008/0043099 A1 | 2/2008 | Stein et al. | |
| 2008/0147321 A1 | 6/2008 | Howard et al. | |
| 2008/0170122 A1* | 7/2008 | Hongo | G06T 7/33 348/148 |
| 2008/0192132 A1 | 8/2008 | Bechtel et al. | |
| 2008/0231710 A1 | 9/2008 | Asari et al. | |
| 2008/0247602 A1* | 10/2008 | Fields | G06K 9/209 382/106 |
| 2008/0266396 A1 | 10/2008 | Stein | |
| 2009/0113509 A1 | 4/2009 | Tseng et al. | |
| 2009/0160987 A1 | 6/2009 | Bechtel et al. | |
| 2009/0190015 A1 | 7/2009 | Bechtel et al. | |
| 2009/0201384 A1 | 8/2009 | Kang et al. | |
| 2009/0256938 A1 | 10/2009 | Bechtel et al. | |
| 2009/0290032 A1 | 11/2009 | Zhang et al. | |
| 2010/0165102 A1 | 7/2010 | Klebanov et al. | |
| 2010/0295945 A1 | 11/2010 | Plemons et al. | |
| 2010/0295948 A1 | 11/2010 | Xie et al. | |
| 2011/0216201 A1 | 9/2011 | McAndrew et al. | |
| 2011/0238252 A1 | 9/2011 | Takeda et al. | |
| 2012/0045112 A1 | 2/2012 | Lundblad et al. | |
| 2012/0069185 A1 | 3/2012 | Stein | |
| 2012/0200707 A1 | 8/2012 | Stein et al. | |
| 2012/0314071 A1 | 12/2012 | Rosenbaum et al. | |
| 2012/0320209 A1 | 12/2012 | Vico et al. | |
| 2013/0141580 A1 | 6/2013 | Stein et al. | |
| 2013/0147957 A1 | 6/2013 | Stein | |
| 2013/0169812 A1 | 7/2013 | Lu et al. | |
| 2013/0250114 A1 | 9/2013 | Lu | |
| 2013/0286193 A1 | 10/2013 | Pflug | |
| 2014/0043473 A1 | 2/2014 | Gupta et al. | |
| 2014/0063254 A1 | 3/2014 | Shi et al. | |
| 2014/0098229 A1 | 4/2014 | Lu et al. | |
| 2014/0184799 A1 | 7/2014 | Kussel | |
| 2014/0247352 A1 | 9/2014 | Rathi et al. | |
| 2014/0247354 A1 | 9/2014 | Knudsen | |
| 2014/0320658 A1 | 10/2014 | Pliefke | |
| 2014/0333729 A1 | 11/2014 | Pflug | |
| 2014/0347486 A1 | 11/2014 | Okouneva | |
| 2014/0350834 A1 | 11/2014 | Turk | |
| 2015/0022664 A1 | 1/2015 | Pflug et al. | |
| 2015/0036885 A1 | 2/2015 | Pflug et al. | |
| 2017/0323459 A1 | 11/2017 | Ermilios | |

FOREIGN PATENT DOCUMENTS

| | | |
|---|---|---|
| EP | 0697641 A2 | 2/1996 |
| EP | 1115250 A1 | 7/2001 |
| EP | 2377094 A1 | 10/2011 |
| EP | 2667325 A1 | 11/2013 |
| JP | 6227318 B2 | 8/1994 |
| JP | 07105496 | 4/1995 |
| JP | 2630604 | 7/1997 |
| JP | 200274339 A | 3/2002 |
| JP | 20041658 A | 1/2004 |
| WO | 1996038319 A2 | 12/1996 |
| WO | 2010099416 A1 | 9/2010 |
| WO | 2011028686 A1 | 3/2011 |
| WO | 2012139636 A1 | 10/2012 |
| WO | 2012139660 A1 | 10/2012 |
| WO | 2012143036 A1 | 10/2012 |
| WO | 2012145818 A1 | 11/2012 |
| WO | 2012145819 A1 | 11/2012 |
| WO | 2016087298 A1 | 6/2016 |

OTHER PUBLICATIONS

Behringer et al., "Simultaneous Estimation of Pitch Angle and Lane Width from the Video Image of a Marked Road," pp. 966-973, Sep. 12-16, 1994.

Bow, Sing T., "Pattern Recognition and Image Preprocessing (Signal Processing and Communications)", CRC Press, Jan. 15, 2002, pp. 557-559.

Broggi et al., "Self-Calibration of a Stereo Vision System for Automotive Applications", Proceedings of the 2001 IEEE International Conference on Robotics & Automation, Seoul, KR, May 21-26, 2001.

(56) References Cited

OTHER PUBLICATIONS

Franke et al., "Autonomous driving approaches downtown", Intelligent Systems and Their Applications, IEEE 13 (6), 40-48, Nov./Dec. 1999.
International Search Report dated Aug. 17, 2012 from corresponding PCT Application No. PCT/CA2012/000378.
Kastrinaki et al., "A survey of video processing techniques for traffic applications".
Philomin et al., "Pedestrain Tracking from a Moving Vehicle".
Sahli et al., "A Kalman Filter-Based Update Scheme for Road Following," IAPR Workshop on Machine Vision Applications, pp. 5-9, Nov. 12-14, 1996.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.

\* cited by examiner

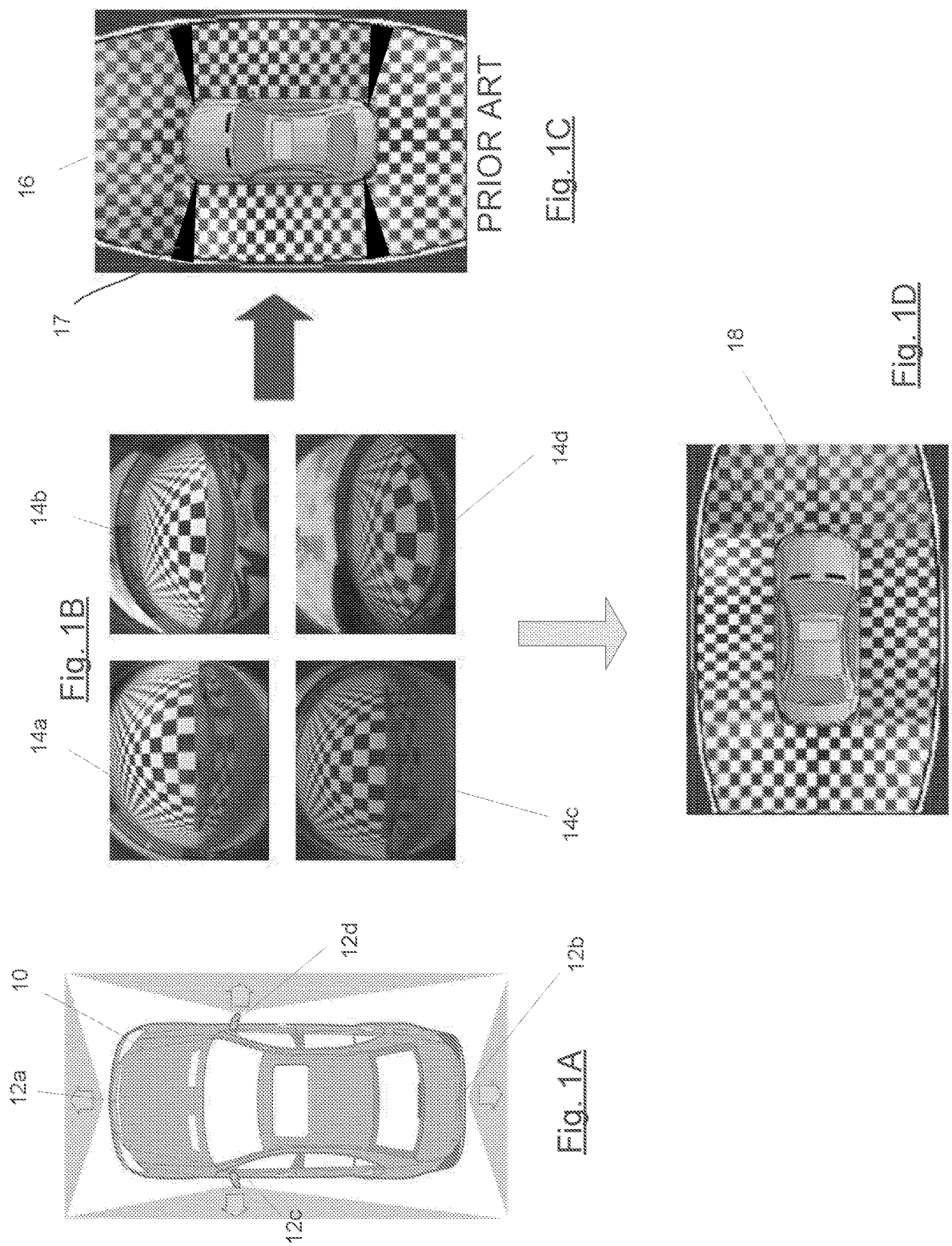

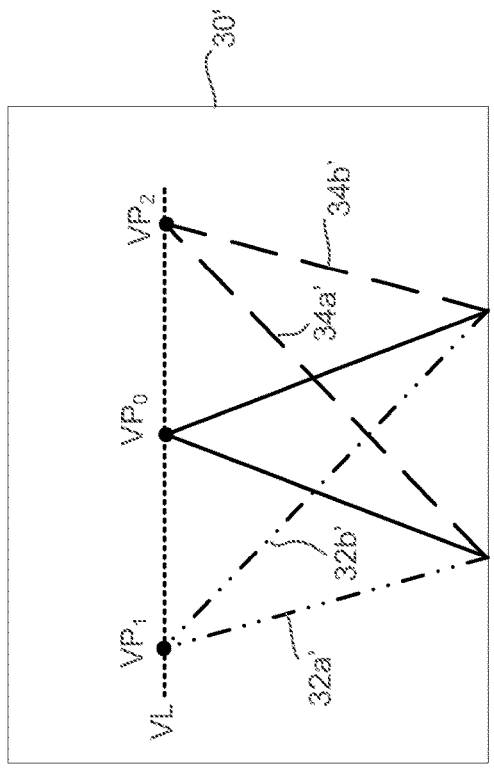
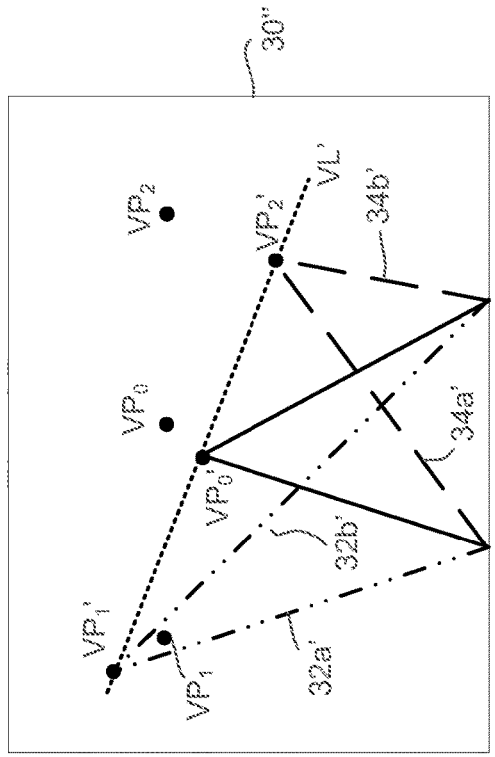
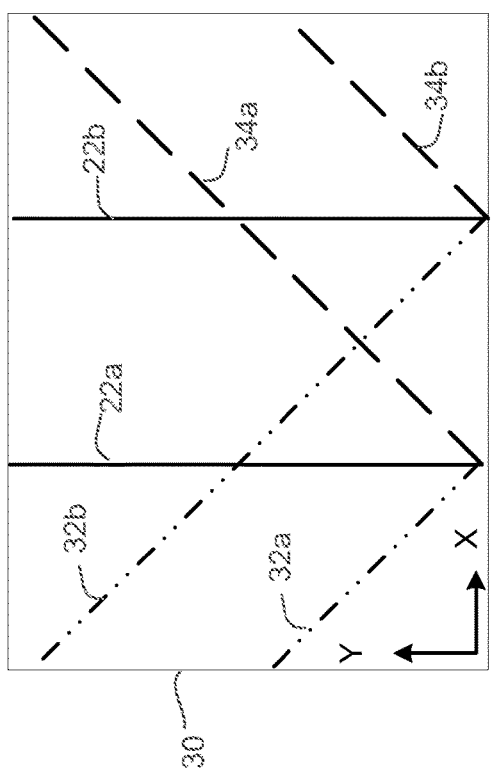
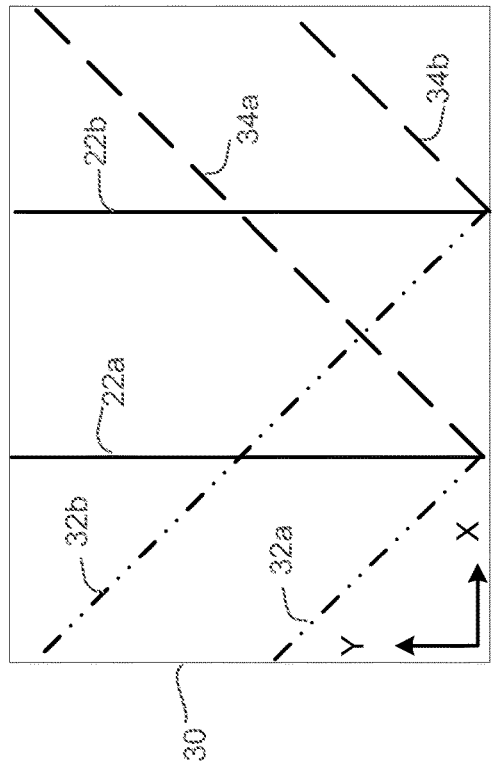

```
If Speed bin has changed
   Update the trajectory structure
End
    If Bin angle not changed
        If we have reached the threshold for the number of trajectories
        per Steering wheel Bin
                • Estimate the vanishing point and output the un-warped
                  VP values to the Vanishing line block
                • Reset the features and trajectories for the specified
                  steering bin
                • New Feature Extraction
                • Start Tracking
                • Read the updated trajectory structure
        Else
            Either continues tracking the features/ OR
            In case of no features, pending
            If we have reached the number of pre-configured frame set
                For each feature tracking path
                    if there is enough data points
                            ▪ un-distort trajectory data
                            ▪ Robust regression of the trajectory
                              path and post filtering
                            ▪ Storing trajectory properties and the
                              features in the trajectory structure
                    end
                End
            • Reset the feature paths
            • New Feature Extraction
            • Start Tracking End
        End
        Else (steering bin is Changed)
        ⁕ Save the selected trajectories
        ⁕ New Feature extraction
        ⁕ Start tracking for the new steering bin angle
        ⁕ Update the new trajectory structure if necessary
        ⁕ Reset the counter and assign the first frame as the current
          frame. These two parameters are used for the condition in which
          there are enough frames to collect and record the trajectories.
        • Read the updated trajectory structure
    End
```

Fig. 16

| Case Number | Misaligned Edge | FD | RD | RP | FP |
|---|---|---|---|---|---|
| 1 | No misaligned | 0 | 0 | 0 | 0 |
| 2 | N/A | 0 | 0 | 0 | 1 |
| 3 | N/A | 0 | 0 | 1 | 0 |
| 4 | P | 0 | 0 | 1 | 1 |
| 5 | N/A | 0 | 1 | 0 | 0 |
| 6 | N/A | 0 | 1 | 1 | 1 |
| 7 | R | 0 | 1 | 1 | 0 |
| 8 | P,R | 0 | 1 | 1 | 1 |
| 9 | N/A | 1 | 0 | 0 | 0 |
| 10 | F | 1 | 0 | 0 | 1 |
| 11 | N/A | 1 | 0 | 1 | 0 |
| 12 | F,P | 1 | 0 | 1 | 1 |
| 13 | D | 1 | 1 | 0 | 0 |
| 14 | F,D | 1 | 1 | 0 | 1 |
| 15 | R,D | 1 | 1 | 1 | 0 |
| 16 | More than 2 Edges | 1 | 1 | 1 | 1 |

FIG. 36

AA: All Edges aligned
NA: At least one edge is not aligned

FIG. 39

| Case Number | F | R | FD | RD | RP | FP |
|---|---|---|---|---|---|---|
| 1 | 0 | 0 | 0 | 0 | 0 | 0 |
| 2 | -1 | -1 | -1 | -1 | -1 | -1 |
| 3 | -1 | -1 | -1 | -1 | -1 | -1 |
| 4 | 0 | 0 | 0 | 0 | 0 | 1 |
| 5 | -1 | -1 | -1 | -1 | -1 | -1 |
| 6 | 0 | 1 | 0 | -1 | -1 | -1 |
| 7 | 0 | 1 | 0 | 0 | 0 | 0 |
| 8 | -1 | -1 | -1 | -1 | 0 | 2 |
| 9 | 1 | -1 | 0 | 0 | -1 | -1 |
| 10 | 1 | 0 | -1 | 0 | 0 | 0 |
| 11 | -1 | -1 | 0 | 0 | 0 | -1 |
| 12 | 1 | 0 | 1 | 0 | 0 | 2 |
| 13 | 0 | 0 | 2 | 1 | 0 | 0 |
| 14 | 1 | 0 | 0 | 0 | 0 | 0 |
| 15 | 0 | 1 | 0 | 2 | 0 | 0 |
| 16 | 1 | 2 | 3 | 0 | 0 | 4 |

METHOD AND SYSTEM FOR CALIBRATING VEHICULAR CAMERAS

CROSS REFERENCE TO RELATED APPLICATIONS

The present application is a continuation of U.S. patent application Ser. No. 15/830,116, filed Dec. 4, 2017, now U.S. Pat. No. 10,654,423, which is a continuation of U.S. patent application Ser. No. 14/113,412, filed Oct. 23, 2013, now U.S. Pat. No. 9,834,153, which is a 371 U.S. national phase application of PCT Application No. PCT/CA2012/000378, filed Apr. 25, 2012, which claims the filing benefit of U.S. provisional applications, Ser. No. 61/540,256, filed Sep. 28, 2011, and Ser. No. 61/478,711, filed Apr. 25, 2011, which are hereby incorporated herein by reference in their entireties

FIELD OF INVENTION

The invention relates to the field of vehicular cameras and vision systems and, more particularly, to methods and systems for dynamically calibrating the position or alignment of a vehicular camera in the field.

BACKGROUND OF INVENTION

In an effort to provide drivers with a comprehensive view of their surroundings, vehicle manufacturers have recently proposed and marketed 360 degree vision systems which display a "bird's eye" view of the vehicle and its surroundings. Such 360 degree vision systems typically utilize four wide angle cameras, one at the front of the vehicle, one at the rear and two at the sides. The outputs of these four cameras are displayed together on single display screen to provide a 360 degree image. See, for example, FIGS. 1A, 1B, and 1C, which show a vehicle 10 and the location of cameras 12a-12d, respective camera images 14a-14d, and 360 degree image 16.

A problem arises in attempting to stitch together the aforesaid camera images into a single composite image in that each camera is not absolutely fixed in position. There are tolerances during the manufacture of the cameras and assembly into the vehicle. In addition, and more importantly, the positioning of each camera will vary over the life of the vehicle as it is driven and subjected to the rigours of the real world. Vibrations from bumpy roads and door slams, the effects of car washes and repair and replacement of various parts, as well as the movement of the pivotable vehicle side rearview mirror housings, can all have an effect of the position (including angular orientation) of the vehicular cameras.

For this reason, the commercial 360 degree vision systems may not be seamless. Instead, to avoid having to deal with misalignment of and between the four cameras, the commercial systems basically display the images from the four cameras in four predetermined regions of the display, typically leaving buffer zones 17 between the four images as seen in FIG. 1C. In other words, the images from the four cameras are not seamlessly stitched together to provide a uniform composite 360 degree image 18 as shown in FIG. 1D, which is more visually appealing.

Typically, the cameras are calibrated when the vehicle leaves the factory production line. An end of assembly line tester may be used to project predetermined targets in a controlled environment at known distances from the vehicle. Knowing the real physical position of various markers, it is possible to define a transfer function that maps camera pixel locations to real locations, and from this determine an offset to the nominal camera position. However, this end of line testing method does not solve the problem of being able to independently calibrate the cameras in the field, where there is no controlled environment in which pre-designated markers are situated at known locations. Simply put, it is not desirable to use end-of-line assembly line calibration based on predetermined targets in a controlled environment to calibrate a vehicular camera in the field.

Each vehicular camera has six degrees of freedom, three linear (up-down, right-left, forward-backward) and three rotational (roll, pitch, and yaw). In attempting to stitch together the images from the four cameras based on predetermined demarcation lines defined with respect to nominally positioned cameras, it was noticed that changes in the three rotational degrees of freedom in particular result in a noticeable visual distortion in the composite 360 degrees image. Thus, it is particularly desired to calibrate the cameras with respect to the three rotational degrees of freedom.

SUMMARY OF INVENTION

The present invention presents a method and system for dynamically calibrating the cameras of a vehicle, such as forward and rearward and sideward facing cameras that are part of a surround view or bird's eye view vision system or the like. The forward and rearward facing cameras may be calibrated by utilizing a vanishing point analysis, such as by utilizing aspects of the vision systems described in U.S. Pat. Nos. 7,991,522; 7,877,175 and 7,720,580, which are hereby incorporated herein by reference in their entireties, or by utilizing one or more inclination sensors such as by utilizing aspects of the alignment systems described in U.S. provisional application Ser. No. 61/513,745, filed Aug. 1, 2011, which is hereby incorporated herein by reference in its entirety. The sideward facing cameras may be calibrated by processing of images at an overlap region of the field of view of the forward facing camera and the sideward facing camera to determine whether or not an object in the field of view of the forward facing camera (when the forward facing camera is properly calibrated) is at a corresponding or correct or predicted location in the field of view of the sideward facing camera when the object is at the overlap region of the fields of view of the forward and sideward facing cameras. If the object is not detected by the appropriate or predicted pixels of the sideward facing camera, the system may adjust the processing of the camera to shift the images to accommodate any misalignment of the sideward facing camera.

The present invention thus provides means for ascertaining the position of a vehicular camera in the field without manual intervention. The knowledge of the camera position may thus be used to calibrate the camera so as to seamlessly stitch together images from all four cameras. It will also be appreciated that the knowledge of camera position can also be used to calibrate the camera for a variety of other functions, for example, when one or more of the cameras are used for object detection, lane departure warning, automatic high beam control and other such driver assistance purposes.

In accordance with the present invention, one camera (such as a forward facing camera) is used as a reference and the other cameras (such as the sideward facing cameras) are calibrated relative to the reference camera. In this approach not all the cameras may be perfectly aligned with respect to the vehicle but they will be calibrated with respect to each other and yield a commercially acceptable 360 degree composite image. The reference camera may be independently calibrated via any suitable means.

In accordance with an aspect of the present invention, calibration of the sideward facing cameras may be performed when or after the forward facing camera is properly calibrated or calibrated to be within a threshold degree of alignment or misalignment. The sideward facing camera and the forward facing camera have respective fields of view that have overlapping portions. For example, the forward facing camera may have a field of view of about 185 degrees (or more or less depending on the particular application) and thus encompass a sideward region at and forward of the vehicle, while the sideward facing camera may have a field of view of about 185 degrees (or more or less depending on the particular application) that encompasses a side region at the vehicle and a forward region and rearward region, with the sideward region of the forward camera's field of view overlapping or encompassing the forward region of the sideward camera's field of view. When an object is in the overlapping area, the system determines the pixel location of the detected object in the forward facing camera's imaging array, and can thus determine the pixel location where the detected object should be or where it is expected to be in the sideward facing camera's imaging array. If the object is not detected at the determined pixel location (or is outside of a threshold amount from the determined pixel location) in the sideward facing camera's imaging array, the system determines that the camera is misaligned or not properly calibrated and the adjusts or shifts the image processing accordingly to accommodate the determined degree of misalignment of the sideward facing camera.

In accordance with another aspect of the present invention, a vehicular camera is independently calibrated using dynamic images obtained in the field. The calibration of the forward facing camera is carried out by utilizing the principle of vanishing points, wherein parallel lines in a scene meet at a vanishing point, such as discussed below.

According to this aspect of the invention a vehicular camera is independently calibrated using dynamic images obtained in the field, such as by utilizing aspects of the system described in PCT Application No. PCT/CA2012/000056, filed Jan. 20, 2012, which is hereby incorporated herein by reference in its entirety. The calibration is carried out by utilizing the principle of vanishing points, wherein parallel lines in a scene meet at a vanishing point. The invention ascertains a vanishing line based on a locus of such vanishing points. The position of the vanishing line is correlated to the position of the vehicular camera, including in particular the angular positions thereof.

These and other objects, advantages, purposes and features of the present invention will become apparent upon review of the following specification in conjunction with the drawings.

BRIEF DESCRIPTION OF THE DRAWINGS

The foregoing and other aspects of the invention will be better understood with respect to the attached drawings, wherein:

FIG. 1A is a schematic diagram of a vehicle having front, rear, and side facing vehicular cameras and the fields of view provided thereby;

FIG. 1B is an example of images obtained by each of the four cameras shown in FIG. 1A;

FIG. 1C is an image provided by a 360 degree vision system according to the prior art where the individual images provided by the cameras shown in FIG. 1B are not seamlessly stitched into a composite 360 degree image;

FIG. 1D is an image provided by a 360 degree vision system according to the present invention which seamlessly stitches together the individual images provided by the cameras as shown in FIG. 1B into a composite 360 degree image;

FIG. 2B is a diagram showing other parallel lines that are angled with respect to the coordinate axis in the ground plane of FIG. 2A and FIG. 3B is a diagram showing the effect of these other parallel lines when projected onto the image plane of FIG. 3A in circumstances where the camera situated at its nominal position;

FIG. 2C is identical to FIG. 2B, and FIG. 3C is a diagram showing the sets of parallel lines in FIGS. 2A and 2B when projected onto the image plane provided by the camera in circumstances where the camera is NOT situated at its nominal position but has rotated;

FIG. 16 provides pseudo code for the algorithm shown in FIG. 12;

FIG. 36 is a list of states that the trigger module generates based on the results of misalignment;

FIG. 39 is a table that the online calibration control may use to provide an output state based on the input from the trigger module in accordance with the present invention;

DETAILED DESCRIPTION OF PREFERRED EMBODIMENTS

In the present application, unless the context dictates otherwise, the following terms have the following meanings:

"ground plane" refers to a real plane parallel to the roadway.

"image plane" refers to a two-dimensional space provided as an output of a camera viewing a real three-dimensional space.

"plane at infinity" means all points at infinity, and refers to a plane that is perpendicular to the ground plane.

"horizon line" is the intersection of the ground plane with the plane at infinity.

"vanishing point" is a point at which parallel lines in the ground plane seem to converge in an image plane. If the camera is centered between two parallel lines in the ground plane which are parallel to the camera optical axis, the intersection of the two parallel lines is referred to as the "central vanishing point".

"principal point" refers to the central vanishing point of a camera when the camera is at its nominal installed position and orientation. This principal point is an intrinsic camera parameter and provided as part of the manufacturing data.

"vanishing line" is a locus of estimated vanishing points.

Figure 1E:
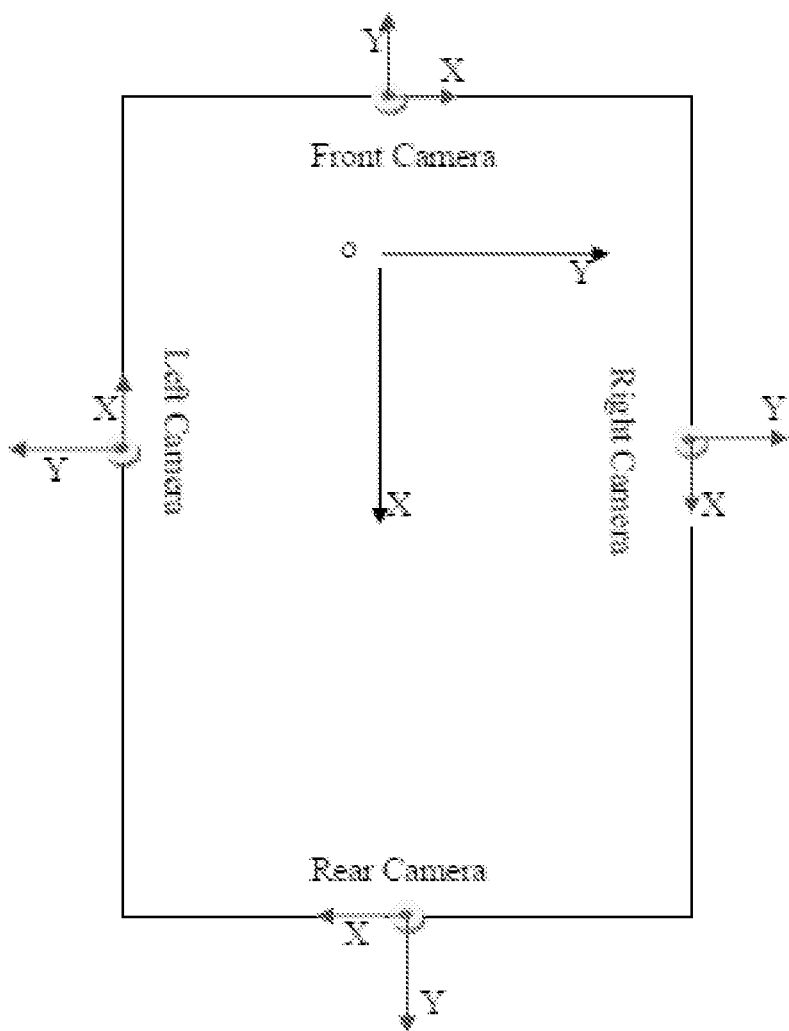
FIG. 1E is a diagram showing the relationships between individual camera coordinate systems and a vehicle coordinate system.

"camera rotational angles" are the angles that define the actual orientation of the camera. FIG. 1E shows the position of the four cameras with respect to the vehicle coordinate system. The right hand system is assumed to be positive for the rotations. The order of rotations is around Z axis (Rz)→Y axis (Ry)→X axis (Rx). Consider the total rotation of each camera to be defined in terms of its rotation around the individual camera coordinates: X axis (pitch or $\alpha$), Y axis (yaw or $\beta$) and Z axis (roll or $\gamma$). The rotations, by definition, are not commutative and thus, the order in which the camera is rotated around the different axes is important. For our purpose, the camera is first rolled, followed by yaw and then pitch, making the order of rotations as Z axis (roll)→axis (yaw)→X axis (pitch).

"dewarping" refers to a procedure for devolving distortions produced by a wide angle camera lens. In the preferred embodiment the vehicular camera employed for the 360 degree composite image is a very wide angle, omni-vision camera, so the original images are distorted. A dewarping procedure as known in the art per se is necessary to account for this distortion and to convert curvy trajectories to straight trajectories. Once the convergence point (vanishing point) is found, its coordinates are dewarped to give the final image coordinates.

Figure 3A:
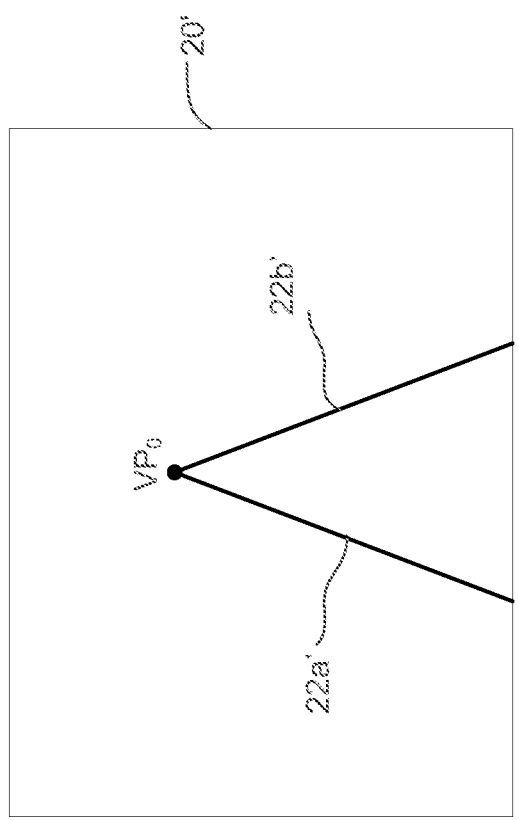
FIG. 2A is a diagram showing two lines parallel to a coordinate axis in a ground plane and FIG. 3A is a diagram showing the effect of these two parallel lines when projected onto an image plane provided by the camera in circumstances where the camera situated at its nominal position.
Figure 2A:
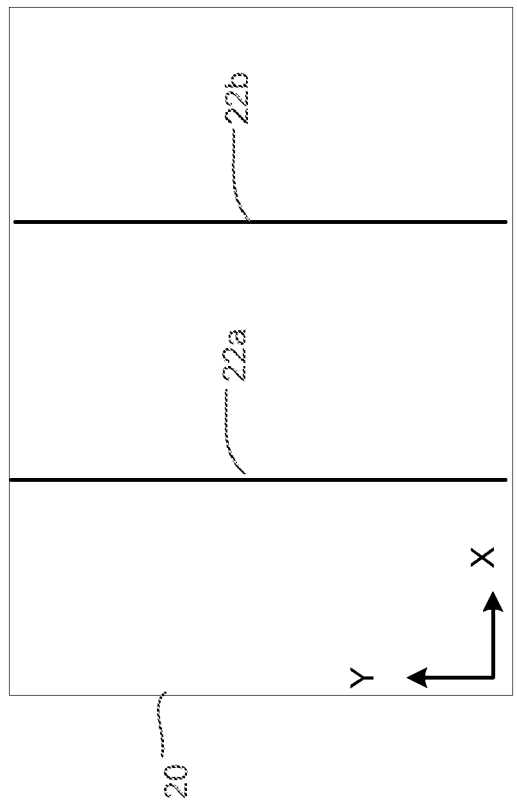

The system may first calibrate or align the forward facing camera by ascertaining a vanishing line based on a locus of such vanishing points. The position of the vanishing line is correlated to the position of the vehicular camera, including in particular the angular positions thereof. This aspect of the invention can be better appreciated with respect to FIGS. 2A-2C and 3A-3C. FIG. 2A shows a ground plane 20, defined by X, Y coordinates. The ground plane is defined by the roadway. FIG. 3A shows an image plane 20' defined by x, y coordinates. The image plane 20' is provided in this example by the front facing camera 12a.

FIG. 2A also shows two lines 22a, 22b that are parallel with the Y-axis in the ground plane 20. However, these two lines 22a, 22b will be seen in the image plane 20' as non-parallel lines 22a', 22b' as shown in FIG. 3A. The non-parallel lines 22a', 22b' will meet at a central vanishing point $VP_0$ in the image plane 20'.

Similarly, referring additionally to FIG. 2B, other sets of parallel lines such as 32a, 32b and 34a, 34b that are angled with respect to the Y-axis ground plane 30 will be seen as non-parallel lines 32a', 32b' and 34a', 34b' in image plane 30', as shown in FIG. 3B. The non-parallel lines 32a', 32b' will meet at vanishing point $VP_1$ in the image plane 30' and the non-parallel lines 34a', 34b' will meet at vanishing point $VP_2$ in the image plane 30'. The locus of vanishing points $VP_0$, $VP_1$, $VP_2$ in the image plane 30' will yield a vanishing line VL. In circumstances where the camera is perfectly aligned with no rotational error as shown in FIG. 3B, the vanishing point $VP_0$ will be located at a preordained pixel position (such as at the horizontal centre of the image) and the vanishing line VL will be perfectly horizontal in the image plane 30' and located at a preordained vertical pixel height. Thus, FIG. 3B shows the situation in the image plane when the front facing camera is situated at its nominal position.

However, if the position including the rotational angles of the front camera has shifted then, as shown in the ground and image planes 30, 30" of FIGS. 2C and 3C, the same ground plane conditions (FIG. 2C is identical to FIG. 2B) will generate shifted vanishing points $VP_0'$, $VP_1'$, $VP_2'$ and a shifted (and angled with respect to the horizontal) vanishing line VL' in the image plane. The changes in the central vanishing point $VP_0$ and in the vanishing line VL can be correlated in particular to changes in the angular positions or roll, pitch and yaw of the vehicular camera, enabling the camera to be independently calibrated.

Figure 4A:
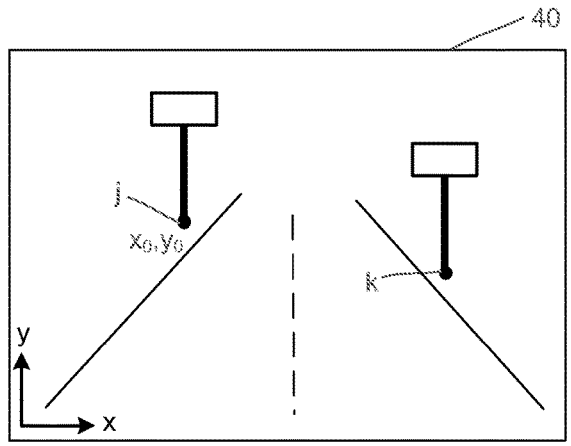
FIGS. 4A-4C are diagrams showing the motion trajectories of feature points over successive image frames in a video stream provided by the front camera.
Figure 6A:
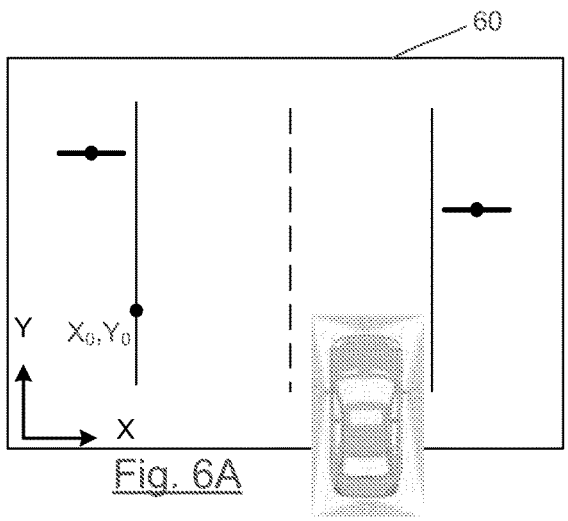
FIGS. 6A-6C are diagrams showing the corresponding motion trajectories of the feature points in FIGS. 4A-4C in the ground plane.
Figure 4B:
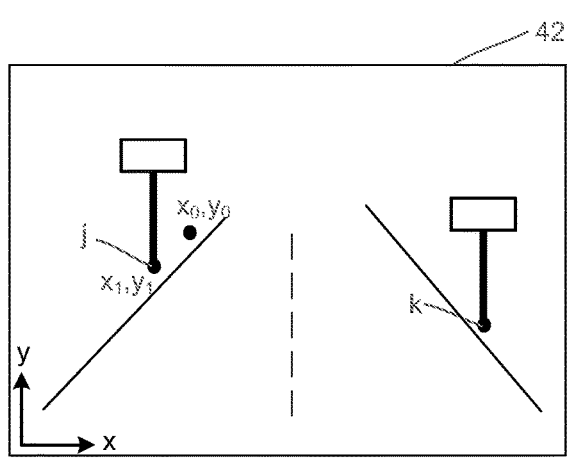
Figure 6B:
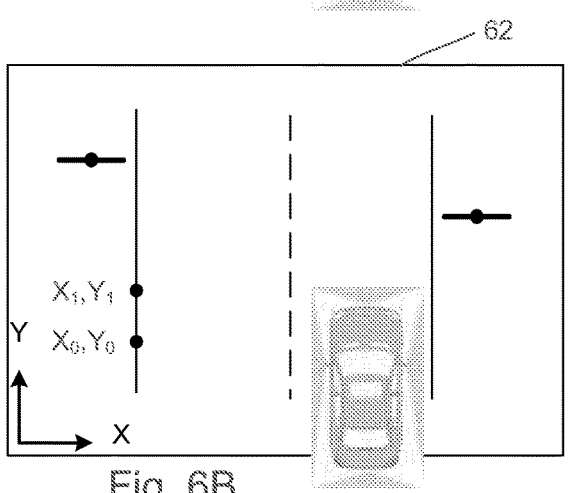
Figure 4C:
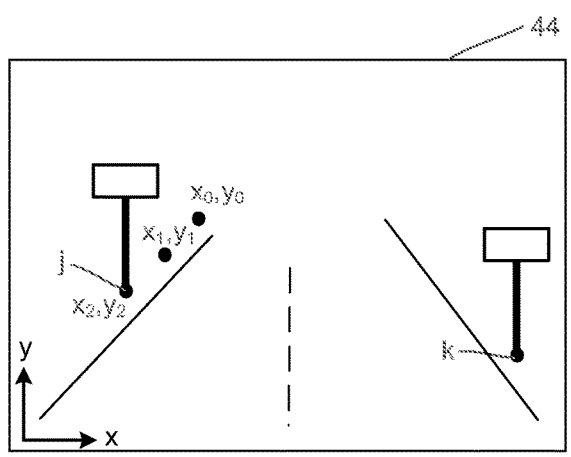
Figure 6C:
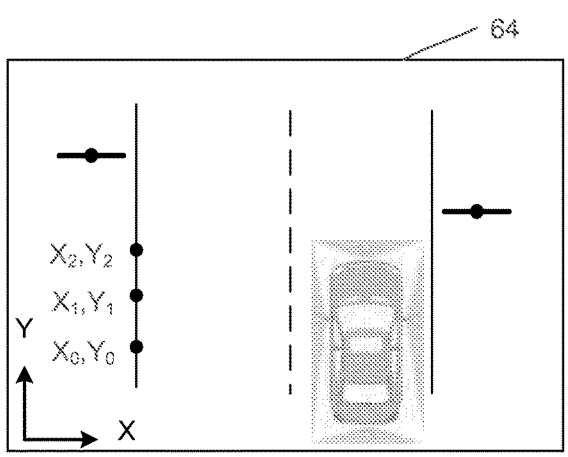
Figure 5:
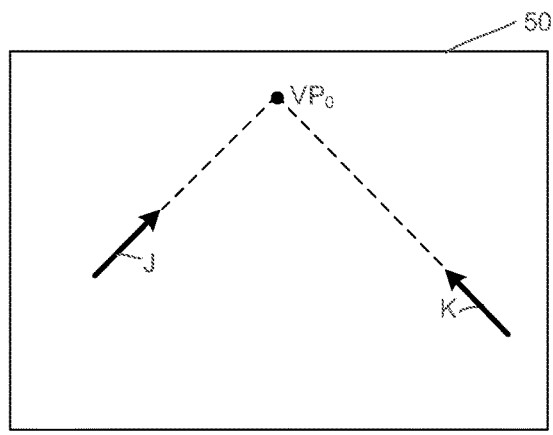
FIG. 5 is a diagram showing vectors in the image plane derived from the motion trajectories of FIGS. 4A-4C.
Figure 7:
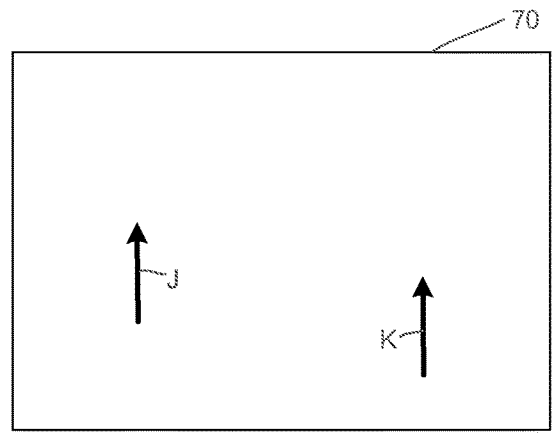
FIG. 7 is a diagram showing vectors in the ground plane derived from the motion trajectories of FIGS. 6A-6C.

To find parallel lines in a dynamic situation where the vehicle is in motion, this aspect of the invention selects a plurality of feature points in the scene and tracks the subsequent positions of these points in a set of image frames acquired from the camera video stream as the vehicle moves. Thus, for example, as shown in the schematic diagrams of FIGS. 4A-4C, feature point j (the base of a traffic sign pole on one side of the road) and feature point k (the base of a traffic sign pole on the other side of the road) are tracked at subsequent image frames 40, 42, 44. The pixel positions of these feature points will change over the subsequent image frames to yield, for example, vector J, comprising points $(x_0, y_0), (x_1, y_1), \ldots (x_n, y_n)$, in respect of feature point j, and vector K in respect of feature point k. The vectors J and K are graphed in an image plane 50 in FIG. 5, and can be extrapolated to ascertain the central vanishing point $VP_0$ in the image plane 50. The corresponding situation is shown in ground planes 60, 62, 64 of FIGS. 6A-6C, from which it should be appreciated that the motion of the vehicle relative to the feature points can be utilized to extract parallel lines J and K in the ground plane 70 as shown in FIG. 7.

In the situation just discussed, the vehicle is shown moving in a straight line so as to enable the central vanishing point to be determined. However, when the vehicle turns as a result of a change in its steering angle, the motion of the vehicle can be approximated over relatively short distances (approximately 0.5 to 2 seconds of travel time, depending of vehicle speed) as a straight motion at an angle with respect to the ground Y-axis. Repeating the foregoing process of extracting and tracking the trajectories of feature points for various steering angle ranges as the vehicle moves will enable other vanishing points to be determined, hence enabling the determination of the vanishing line.

Similar conditions and circumstances exist for the rear and side camera, but the exact relationship between changes in camera angular position and shifts in the central vanishing point and vanishing will differ.

From the foregoing then, it will be appreciated that the present invention provides a method of dynamically ascertaining the position or alignment of a vehicular camera relative to a vehicle to which the camera is attached. The method includes the steps of: (a) establishing a plurality of vehicular steering angle ranges; (b) acquiring a set of image frames in a video stream provided by the camera whilst the vehicle is in motion, the image frames defining an image plane; (c) measuring the steering angle of the vehicle and, for each steering angle range: (i) selecting a plurality of feature points in the image frames, (ii) tracking a motion trajectory of each selected feature point in the set of image frames, and (iii) determining a vanishing point in the image plane for the plurality of tracked motion trajectories; (d) determining a vanishing line in the image plane provided by the camera based on a locus of said vanishing points; and (e) determining the position or alignment of the camera based on the position of a central vanishing point (determined when the steering angle range encompasses 0 degrees) and the vanishing line.

In the second aspect of the invention, one of the cameras, preferably the front-facing camera, is used as a base or reference and the other cameras are calibrated relative to the reference camera (the reference camera is itself preferably independently calibrated in accordance with the first aspect of the invention). The present invention uses the overlapping region between the adjacent cameras (such as the forward facing camera and a sideward facing camera) to calibrate the sideward facing cameras. This is achieved by estimating the corresponding features between the overlapping regions and using these corresponding features to adjust the relative calibration of the sideward camera, as discussed in detail below.

Figure 30:
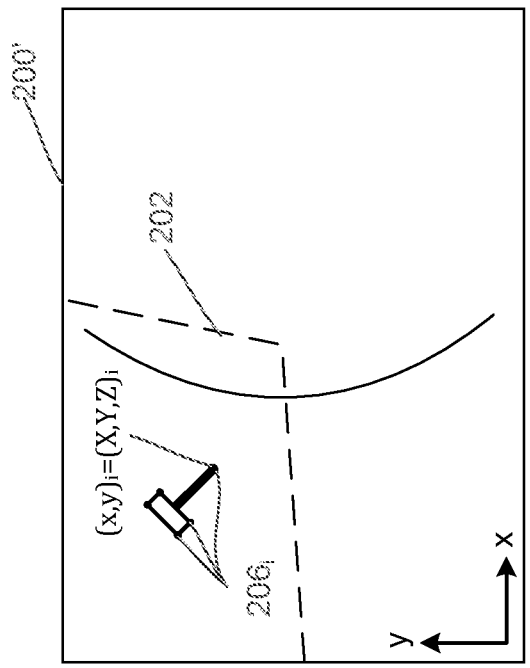
FIGS. 29 and 30 are schematic diagrams showing overlapping regions captured by front and side cameras, respectively.
Figure 29:
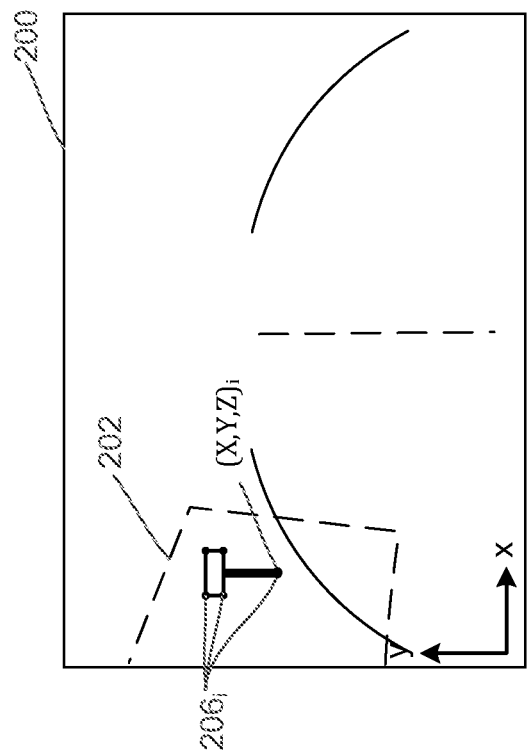

This aspect of the invention can be better appreciated with reference to FIGS. 29 and 30, which respectively show a schematic image frame 200 provided by the front-facing camera and a schematic image frame 200' provided by one of the side-facing cameras (such as the driver side camera). The two image frames have a common, overlapping visual region 202. The common region will look visually different in the respective image frames 200 and 200' due to the orientations of the cameras and their intrinsic parameters (for example, the cameras may have different lens angles and focal lengths) but nonetheless it is physically the same space. Let image frame 200 be the reference frame. By using the intrinsic parameters of the front-facing camera, the pixel position of each feature point $206_i$ (in the example, corners of a street sign) can be resolved to a physical location $(X, Y, Z)_i$. In the image frame 200' to be calibrated, each feature point is found at a pixel location $(x, y)_i$. Each feature point $206_i$ is associated with a nominal physical position $(X', Y', Z')_i$ based on the intrinsic parameters of the side facing camera. However, the actual physical location of each feature point $206_i$ is also known, i.e., it is $(X, Y, Z)_i$ as determined from image frame 200. Thus the changes in the physical locations of these feature points, i.e., $(X', Y', Z')_i - (X, Y, Z)_i$, can be computed to arrive at a correction factor or corrective transformation matrix. Or, a transformation may be found to map the pixels in the image frame 200' to the real physical locations and vice versa, which will differ from the nominal transformation matrix. Having mapped the pixels in image frame 200' to the real reference frame 200, a real demarcation line may then be selected in each image frame to seamlessly stitch portions of these images together. The process may be applied to the other cameras in turn (for example, the rear camera may be calibrated to the calibrated side camera) to thus provide a seamless stitched composite 360 degree image.

From the foregoing then, it will be appreciated that the second aspect of the invention provides a method of dynamically calibrating a given vehicular camera relative to a reference camera attached to the vehicle. This method includes: (i) identifying an overlapping region in an image frame provided by the given camera and an image frame provided by the reference camera; (ii) selecting a series of feature points in the overlapped region of the reference image frame and resolving respective real physical locations of the selected feature points; (iii) locating pixel positions of the selected feature points in the given image frame; and (iv) determining alignment of the given camera based on a mapping between the pixel positions of the selected feature points and the respective real physical locations thereof.

Figure 8:
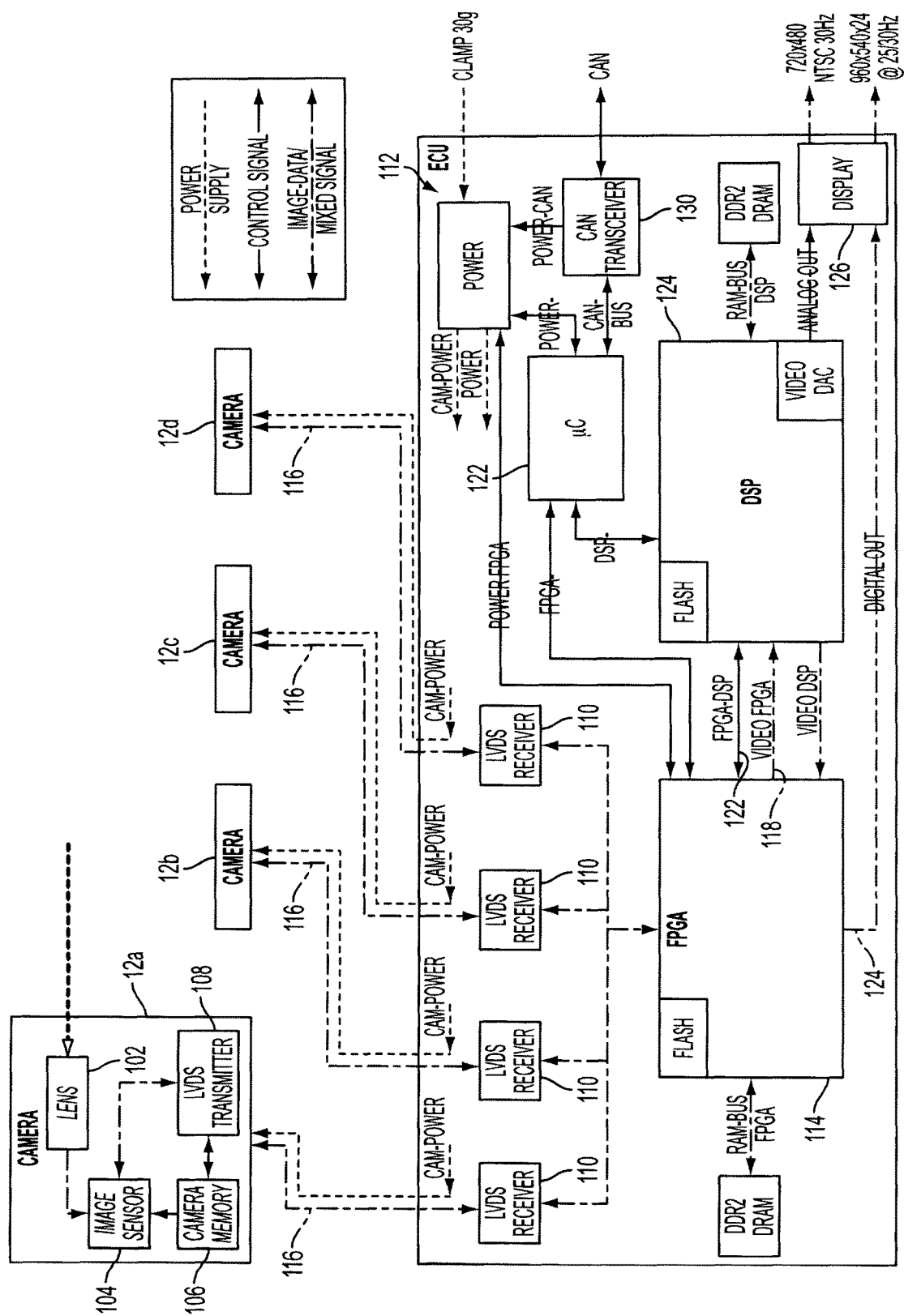
FIG. 8 is a system block diagram from a hardware perspective of the 360 degree vision system.

Referring now to FIG. 8, a hardware schematic is shown for a preferred three-hundred-and-sixty degree vision system 100, which includes the four vehicular cameras 12a-12d, each of which includes a wide angle lens 102 coupled to an image sensor 104, a memory 106 and a transmitter 108. The cameras are coupled via the transmitters 108 to respective receivers 110 on a main electronic control unit (ECU) 112. In this particular embodiment a floating point gate array (FPGA) 114 functions as a multiplexer to provide one of the four camera video streams 116 (each stream comprising successive image frames captured by the camera at a rate of approximately 25-30 frames per second) to an output line 118 that is connected to a digital signal processor (DSP) 120. The DSP 120, in conjunction with an associated microcontroller 122, processes the selected camera video stream and carries out the online calibration (OC) algorithms discussed in detail herein. The FPGA 114 also provides a composite 360 degree view video output 124 to a display driver 126 based on stitching instructions provided by the DSP 120 via a command line 128.

The microcontroller 122 is connected to the vehicle command area network (CAN) via a CAN transceiver 130 and thus can query the main vehicle controller (not shown) for information such as vehicle speed and steering angle.

As summarized above, the OC algorithms according to the first aspect of the invention are based on the concept of vanishing points because the estimation of the camera angles in these algorithms relies on the estimation of the vanishing line. In order to determine the vanishing line, it is necessary to estimate vanishing points corresponding to different orientations of parallel lines in the image. The vanishing line in conjunction with the spatial position of the principal point is used to determine the camera rotational angles.

Ideally, in order to collect various vanishing points in different orientations, there should be various parallel lines with different orientations in the corresponding ground plane. However this is not available in reality since the surrounding view or scene is not a controlled environment. Additionally there exist various external environmental factors preventing a perfect projection of parallel lines into the image plane. Thus, the OC algorithm utilizes the relative motion of the vehicle with respect to various feature points in order to generate motion trajectories to replicate the ideal situation in which there are parallel lines available in the input image. By selecting special features in the input images and tracking for short durations, these points move approximately parallel to the vehicle motion and thus are representative of parallel lines with respect to the coordinate system being considered. The intersection point of these trajectories lies on the vanishing point which is to be estimated. When the vehicle turns, the trajectories have a different orientation depending on the angle of turn. The locus or collection of the various vanishing points in respect of the various steering angles corresponds to different orientations of parallel lines, and enables the vanishing line to be estimated.

I. Coordinate System

FIG. 1E shows a vehicle coordinate system that is used in conjunction with the example described in this publication. The vehicle X-axis lies along the longitudinal axis of the vehicle. The vehicle Y-axis lies along the cross-car direction or latitudinal axis of the vehicle. The vehicle Z-axis is the vertical axis (in/out of the page). The origin point (o) is midway along the front wheel drive axis. Each camera associated with the vehicle has its own camera coordinate system where the X-axis always points to the right of the camera, the Y-axis always points away from the camera and the Z-axis is similar to the Z-axis of the vehicle coordinate system. The camera coordinate systems are also illustrated in FIG. 1E. The calibration of each camera is done so that its rotational angles are first estimated with respect to the camera coordinate system, where pitch ($\alpha$), yaw ($\beta$) and roll) are the rotations around the X-, Y- and Z-axes of the camera coordinate system, respectively. Once calibrated, these rotations can be simply transformed to the equivalent rotations in the vehicle coordinate system as shown in Table 1 below. The rotations around the X-, Y- and Z-axes of the vehicle coordinate system are termed as Rx, Ry and Rz, respectively.

TABLE 1

| Camera | Rz (degrees) | Ry(degrees) | Rx(degrees) |
|---|---|---|---|
| Front | $\gamma + 90$ | $\alpha$ | $-\beta$ |
| Left | $\gamma + 180$ | $-\beta$ | $-\alpha$ |
| Rear | $\gamma + 270$ | $-\alpha$ | $\beta$ |
| Right | $\gamma$ | $\beta$ | $\alpha$ |

Table 2 below shows an example of nominal angular positions of the front 12a, rear 12b and side facing cameras 12c, 12d in a sample vehicle. Note that the roll, pitch and yaw for each camera implies change about a different vehicular axis, e.g., for the front camera pitch is defined as the angle about the vehicle Y-axis and for the right side camera pitch is defined the angle about the vehicle X-axis.

TABLE 2

| Camera | Rz (degrees) | Ry(degrees) | Rx(degrees) |
|---|---|---|---|
| Front | 90 | 62 | 0 |
| Left | 180 | 0 | -12 |
| Rear | 270 | -45 | 0 |
| Right | 0 | 0 | 12 |

II. Front Camera

Figure 9:
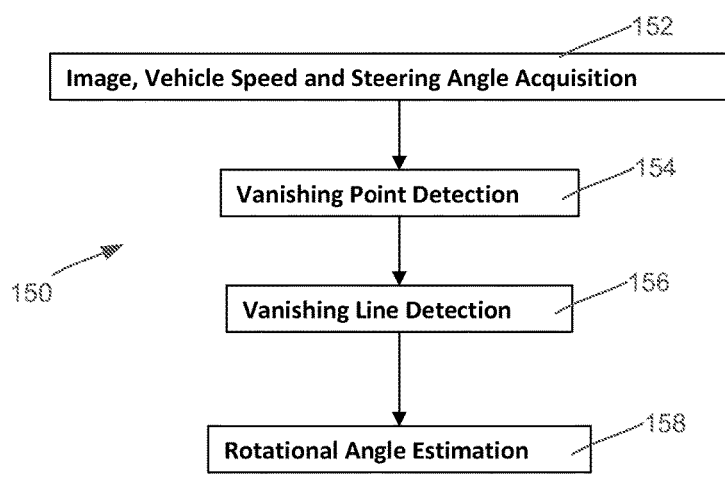
FIG. 9 is a block diagram of an online calibration algorithm executed by the 360 degree vision system for dynamically ascertaining the position, including angular rotations, of the front camera.

A system block diagram of an online calibration (OC) algorithm 150 for the front camera 12a in accordance with the present invention is shown in FIG. 9. Inputs to the algorithm 150 include: (i) data confirming the active camera 12 (front 12a, rear 12b or side 12c, 12d camera); (ii) the intrinsic parameters (principal point, focal length, lens map) for the camera under consideration; and (iii) CAN bus data including the instantaneous vehicle speed and steering angle. In an initial module 152 the vehicle speed and steering angle information is recorded for every image frame captured by the algorithm. In a first module 154, the vanishing points are detected using a motion tracking method. In a following module 156, the vanishing line is estimated based on the locus or collection of the estimated vanishing points for the various steering angles. The estimated central vanishing point in conjunction with the vanishing line leads to the final module 158 of the OC algorithm—the computation of the three camera rotational angles in the camera coordinate system, namely, $\alpha$, $\beta$ and $\gamma$.

A. Inputs

Figure 10:
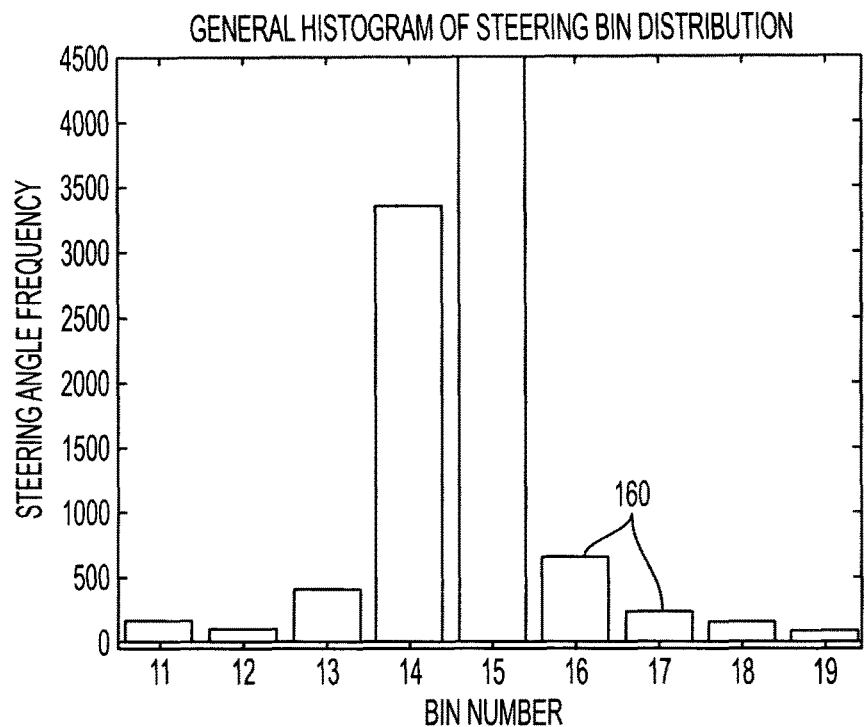
FIG. 10 is a histogram showing distribution of vehicle steering angle over normal driving conditions.
Figure 11:
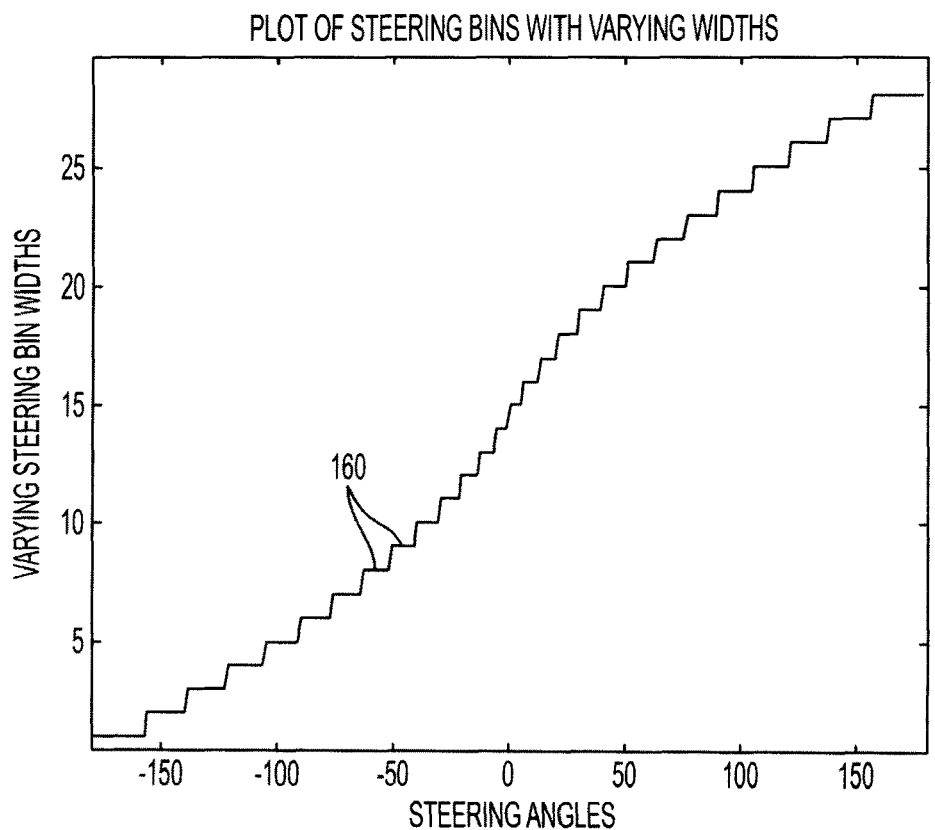
FIG. 11 is a plot showing the size of steering angle bins over the range of steering angles.

The processing of successive image frames in step 152 is conditioned upon two important inputs: steering angle and vehicle speed. The steering angle is one of the major inputs of the OC algorithm 150. Using steering angle data captured during approximately ten hours of normal driving in a variety of scenarios using multiple drivers and with no special maneuvers, the inventors ascertained that during the different driving maneuvers the steering is held almost constant at different corresponding angles within a very small variation range for a computationally reasonable amount of time. FIG. 10 shows a histogram of thirty consecutive frame sets lying in the same steering angle range observed during the normal driving along urban routes by multiple drivers. The steering angle has been partitioned into bins 160 from −180 degrees to +180 degrees in varying increments of 6 degrees or more for this experiment. The way the angles are partitioned is determined by an external function in which the central angles are (such as about −6 to +6 degrees) divided into two central bins with a width of six degrees. The bins have symmetrical structure. The width of the bins for positive and negative angles is the same. The larger the angle becomes the wider the corresponding steering bin. FIG. 11 shows an example of steering bin structure with linear increments for the bins 160 as the angles increase. Note that in alternative embodiments, nonlinear increments for the steering bins 160 may be used.

Furthermore, although with a change in the steering angle the vehicle inscribes a circle, for a very short duration (such as less than or around 1-2 seconds or thereabouts) the path of the vehicle with respect to any point being tracked on the ground could be considered to be a straight line. The sharper the steering angle, the slower the movement of the car and the lesser the distance traveled in a curvature. This further helps to approximate the vehicle motion for very short durations by a straight path even for sharper turns. This allows for the detection of parallel trajectories in the same direction as the path of travel described by the wheels which is at an angle with respect to the vehicular coordinate system. Thus, a different set of vanishing points could be computed for these different set of parallel lines which are at different angles with respect to the vehicular coordinate axes and these vanishing points lie along the vanishing line.

The change in the steering angle from the neutral (or 0 degree) location causes the wheels of the vehicle to move at an angle with respect to the body of the vehicle and thus, any points tracked when steering is non-zero inscribe parallel trajectories which are at an angle to the X-axis of the vehicle coordinate system. To maintain linearity and constancy of the inclination of the trajectories, the captured images are processed as a single set for small increments of steering angles.

The estimation of the vanishing point within each steering bin is thus conditioned upon the steering angle, whereby the input images are processed as a single set only if the steering angle is held within a particular range defined as steering bin. With any change in the steering out of the defined range, the previously computed trajectories are stored and the processing of a new set of images for the new steering bin is initiated The estimation of the vanishing point within each steering bin is also conditioned upon the vehicle speed. The speed of the vehicle has no effect in the path the trajectory follows in the image plane other than the fact the trajectory moves at a faster pixel rate across the frame at higher speeds. So, similar to the steering bin, if the speed values are held within a particular range, pre-defined in the algorithm, the speed bin remains constant. If the speed varies out of the defined range a new speed bin is introduced and several parameters such as tracking duration are updated. The new set of features is thus tracked according to the new set of parameters. For instance the increment in the speed bin causes the features to move faster and therefore the tracking duration will be shortened.

B. Vanishing Point Detection

Figure 12:
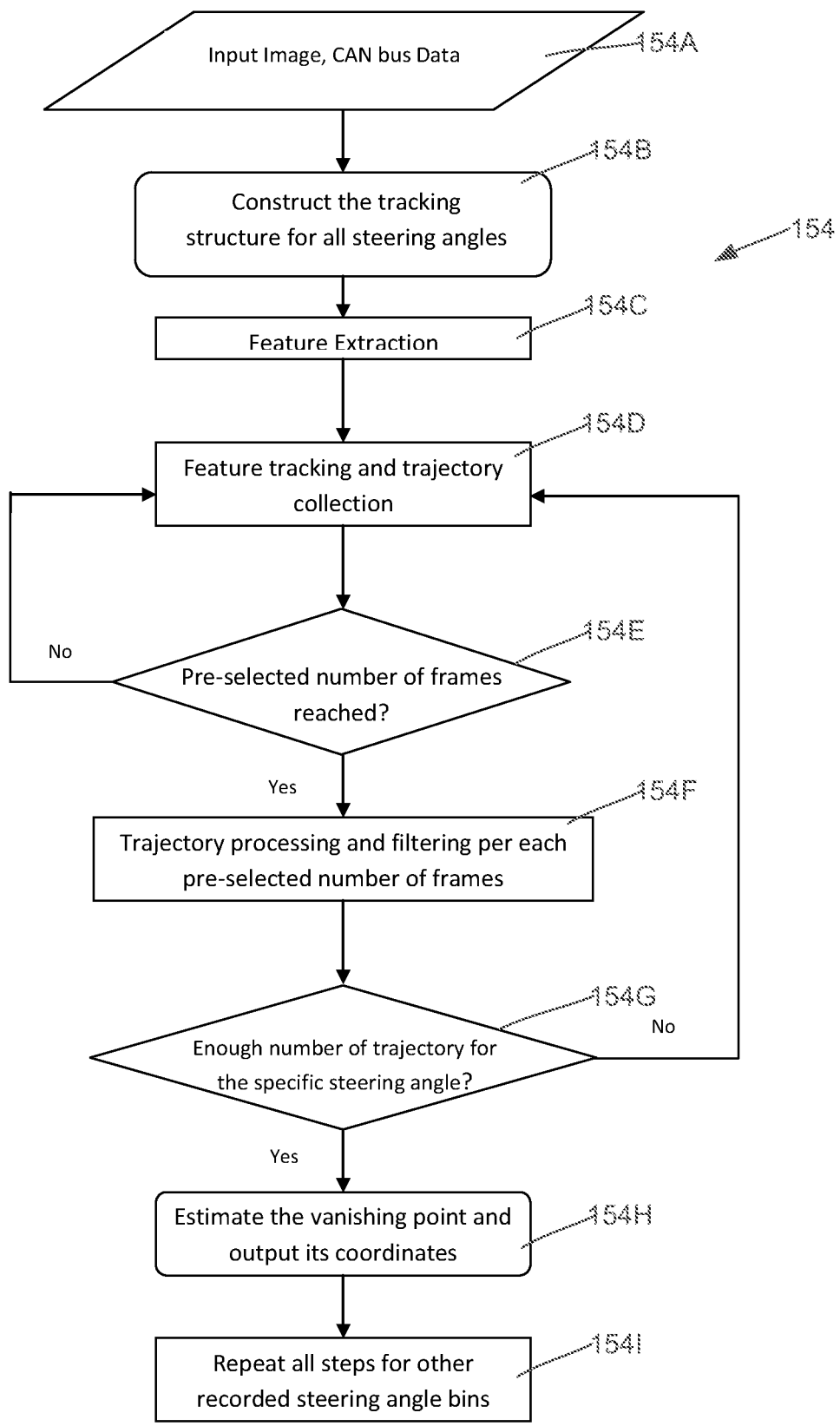
FIG. 12 is a flowchart of a vanishing point detection algorithm.

A flow chart for the vanishing point detection module 154 is shown in FIG. 12. The main inputs 154A to the vanishing point detection module 154 include the image frames of the video stream, steering angle, and vehicle speed. The main goal of this module is to produce the vanishing point based on the available input data.

In an initial step 154B a data structure is constructed for tracking trajectories across a variety of steering angles. In a following step 154C the best features in a region of interest (ROI) that can lead to the determination of the vanishing point are detected and stored. For the front-facing camera, the ROI is close to the visible horizon line. Ideally the ROI should cover the road sides and not that much of the ground.

In the following steps 154D-154G, various feature points are extracted and their motions tracked to generate trajectories. For a pre-configured set of frames (which is a function of speed and steering bin), a new set of features are extracted and tracked over time. The tracking algorithm is based on motion vector estimation using block matching where, for each feature to be tracked in the current frame, a small 8×8 neighborhood around that feature is considered and the best possible match in a small window of pixels in the next frame is found. It is then assumed that the feature in the current frame has moved to the detected location in the next frame. Further information about block matching techniques may be found in PCT Application No. PCT/CA2012/000057, filed Jan. 20, 2012 and entitled "Image Processing Method for Detecting Objects Using Relative Motion", which is hereby incorporated herein by reference in its entirety. The collected trajectories are stored and their spatial properties are evaluated per frame set in steps 154H and 154I.

Figure 13:
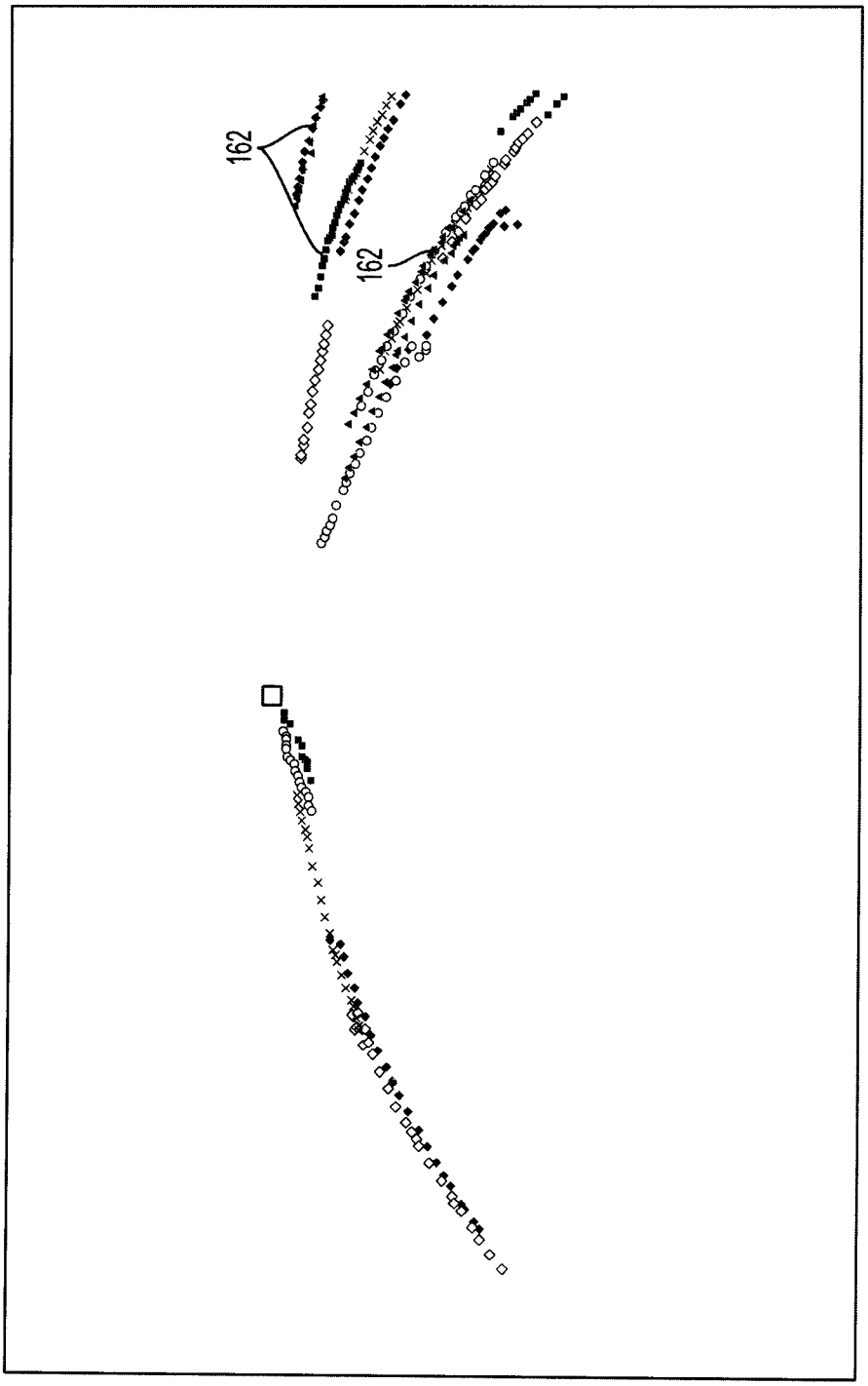
FIG. 13 is a diagram showing feature point motion trajectories in the image plane provided by the front camera.
Figure 14:
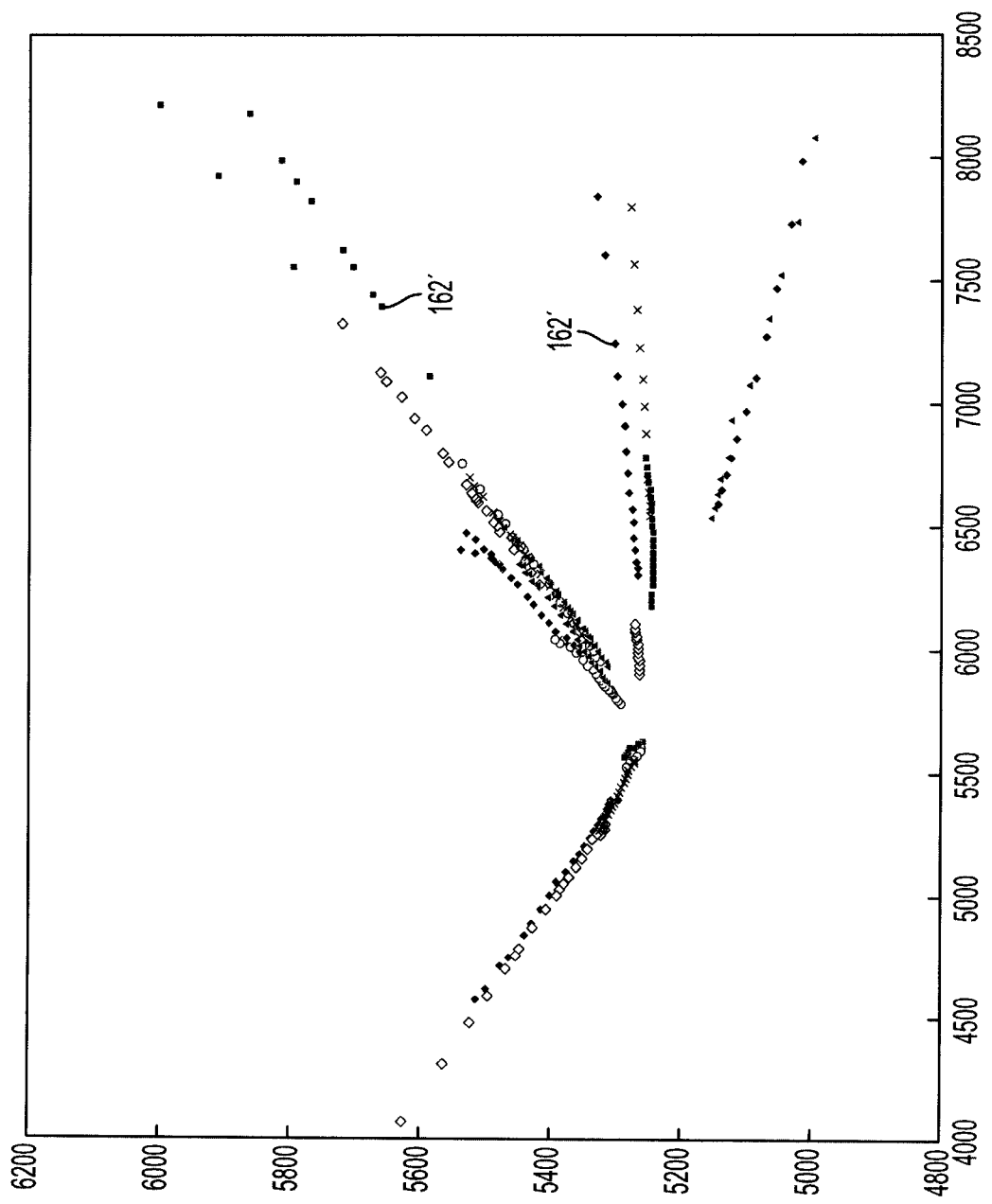
FIG. 14 is a diagram showing dewarped motion trajectories of FIG. 13.
Figure 15:
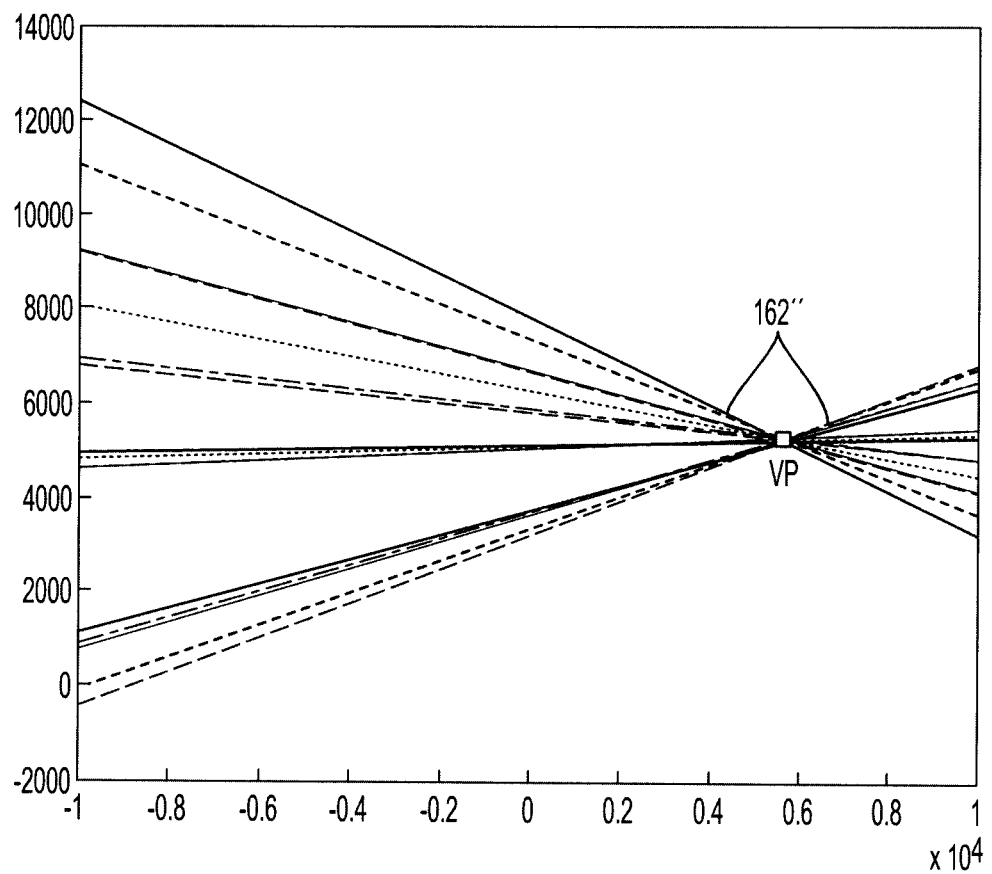
FIG. 15 is a diagram showing linearly fitted, dewarped motion trajectories of FIG. 13, and the location of a vanishing point based on the intersection of such trajectories.

More particularly, in step 154H, the collected trajectories are dewarped. Each trajectory is then linearly fitted using robust regression techniques. If the fitted trajectories meet the criteria set by various threshold (such as sufficient length or time), they are saved. The intersection of these fitted trajectories gives the location of the vanishing point for each steering angle bin. For instance, FIG. 13 shows an example in which trajectories 162 are shown in a warped image space (due to the wide angle lens used in the camera) and FIG. 14 shows trajectories 162' in a dewarped space. FIG. 15 shows the trajectories in the dewarped image linearly fitted to generate substantially linear trajectories 162", enabling a vanishing point VP to estimated (note that FIG. 15 is a mirror image of FIG. 14 utilizing a different scale).

Pseudo code for the vanishing point detection module 154 is presented in FIG. 16. Since the vanishing point is detected and recorded per different steering angle bin, and the threshold values as well as some processing data such as the location of ROI vary depending on the vehicle speed and steering angle, the vanishing point detection module stores the data necessary for the next module in a structured format called a "trajectory structure". The number of elements in the trajectory structure depends on the number of steering bins. The most important elements of this structure are:

(a) Steering bin width. Since it is not feasible to account for each single angle, the bins have been designed to include a group of angles. The number of angles allocated to each bin is determined by an external function.

(b) Pre-configured set of frames. The duration for which each feature is tracked is determined by this number of frames. After reaching this number a new set of features are selected and tracked. The estimation of vanishing points is also conditioned upon the number of frames. The duration of the tracking is dependent upon the steering angle range in consideration, with a sharper steering angle being accounted for by a shorter track length translated into smaller number of frames.

(c) ROI location. The image region in which the initial features are selected.

(d) Number of features threshold per trajectory. The minimum number of features each trajectory must have in order to be qualified for further processing.

(e) Number of trajectories for estimation of vanishing point. A minimum number of trajectories are preferably used or needed to find the vanishing point.

As shown, at the initial stage, the speed bin value is checked and the trajectory structure is updated accordingly. After this step, the code checks a few conditions and depending on the condition, different tasks are performed. If during the tracking process a speed bin change occurs, the trajectory structure is updated. The updated trajectory parameters are not applied to the tracking process, until the next set of tracking. This will not affect the performance since the speed bin does not vary in a shorter time frame than the tracking duration.

C. Vanishing Line Detection

Figure 17:
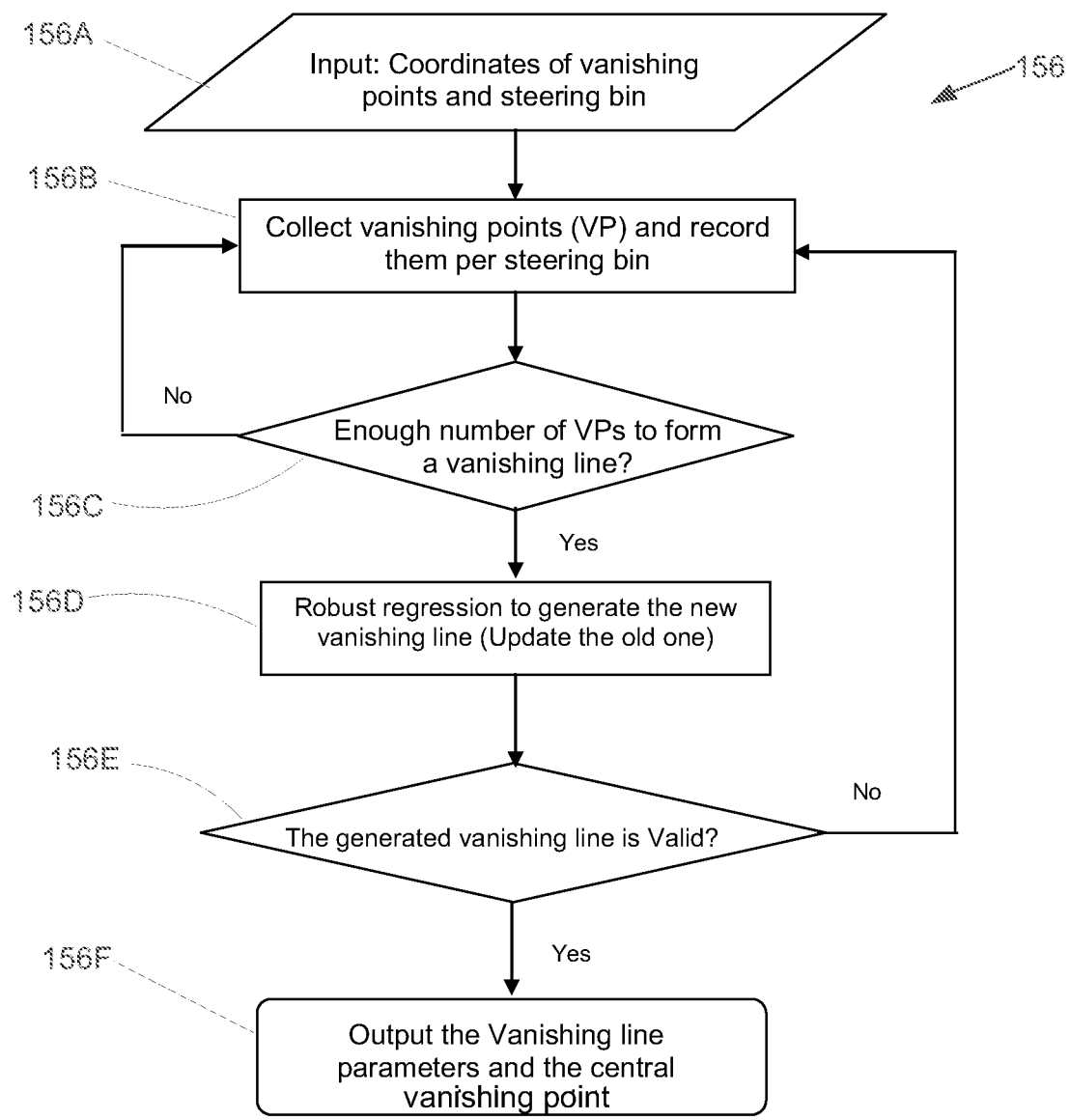
FIG. 17 is a flowchart of a vanishing line detection algorithm.

A self-explanatory flowchart of the vanishing line detection module 156 is shown in FIG. 17. This module is the intermediate step between the vanishing point and the camera rotational angle estimation modules 154, 158. The vanishing line is estimated using a collection of vanishing points obtained during the different normal driving turning maneuvers of the vehicle. Since the estimated vanishing points lie on the visible vanishing line, the best vote vanishing points for each steering range can be used to estimate the vanishing line using a robust fitting scheme. The estimation of the vanishing point in each bin itself may preferably be further refined by statistical voting. To estimate the vanishing line, a well-known robust regression technique in which the linear line parameters are iteratively estimated using least square method has been applied at step 156D.

D. Rotation Angle Estimation

Figure 18:
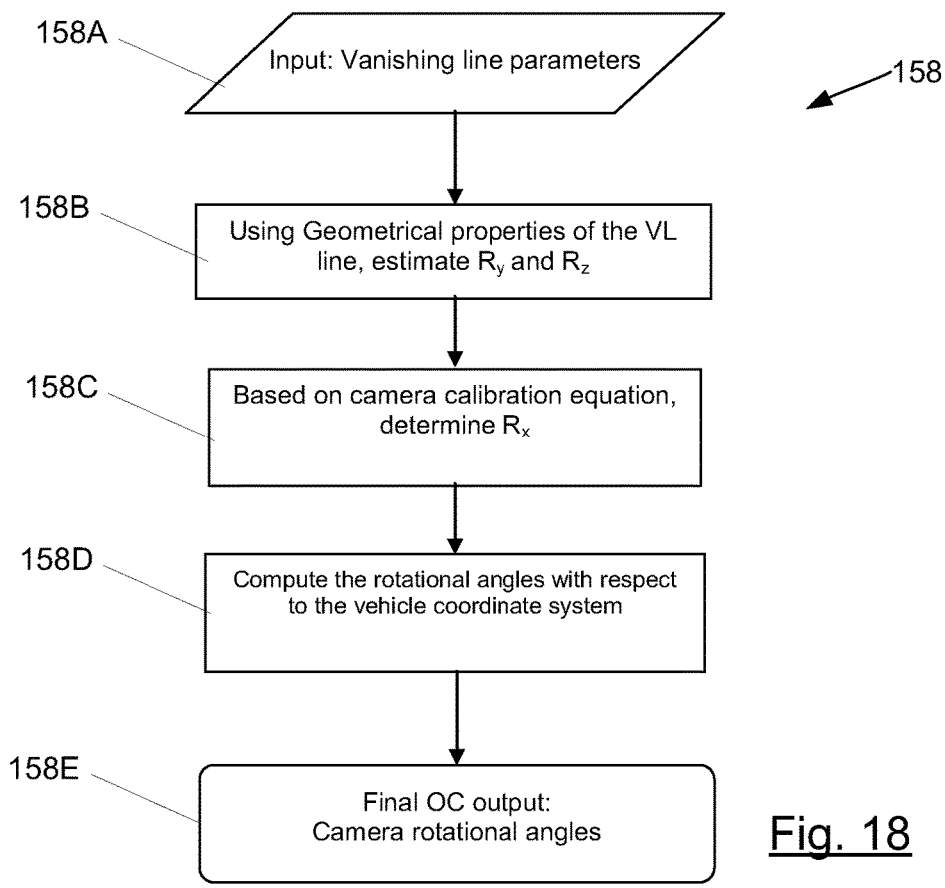
FIG. 18 is a flowchart of a rotational angle estimation algorithm.

Once the vanishing line is estimated, the parameters of the vanishing line are used as inputs to the rotational angle estimation module 158. The output of this module is the final OC output—the camera rotational angles. FIG. 18 shows a flowchart of the algorithm used in this module. Note that the initial output 158E of this module is with respect to the camera coordinate system. The rotations in the camera coordinate system can then be transformed to the vehicle coordinate system as shown above in Table 1.

Figure 19:
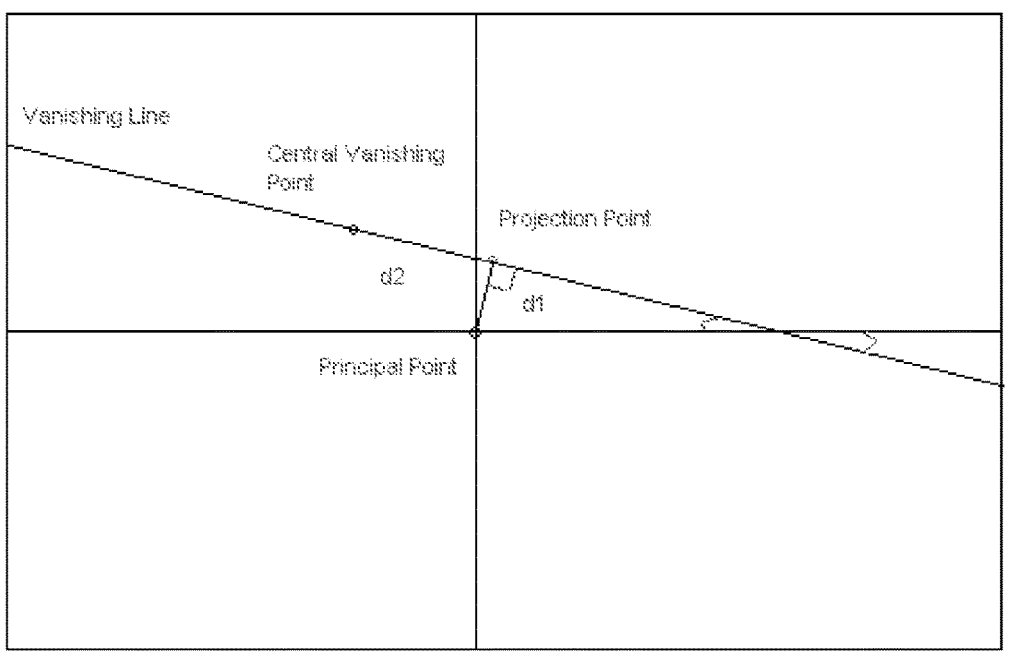
FIG. 19 is a diagram showing various vanishing point and vanishing line parameters in the image plane which are used by the rotational angle estimation algorithm.

Referring additionally to FIG. 19, knowing the location of the principal point, the vertical distance $d_1$ of this point to the vanishing line as well as the distance $d_2$ of a projection point to the central vanishing point are computed. Based on the geometrical relationship between the vanishing line and the actual camera angles, $\alpha$ and $\beta$ angles are estimated. Note that the X, Y and Z coordinates are the camera coordinate system axes, as shown in FIG. 1E.

It has been discovered that the $\alpha$ and $\beta$ angles map uniquely to the $d_1$ and $d_2$ distances, so in order to estimate these angles a lookup table is employed. This lookup table is created by varying the front camera $\alpha$ and $\beta$ angles and recording the resultant $d_1$ and $d_2$ distances for each combination of input $\alpha$ and $\beta$ angles. A small portion of a sample lookup table is presented in Table 3 below. The $d_1$ and $d_2$ distances can be used as indexes into the lookup table for the determination of the $\alpha$ and $\beta$ angles (it should also be understood that the exact relationship between $\alpha$, $\beta$ and $d_1$, $d_2$ will differ depending on the particular arrangements and selection of cameras for each target vehicle).

TABLE 3

| $d_1$ | $d_2$ | $\alpha$ | $\beta$ |
|---|---|---|---|
| 152.5087 | 3.2576 | 62.6000 | −0.5000 |
| 152.5114 | 2.6061 | 62.6000 | −0.4000 |
| 152.5134 | 1.9546 | 62.6000 | −0.3000 |
| 152.5149 | 1.3030 | 62.6000 | −0.2000 |
| 152.5158 | 0.6515 | 62.6000 | −0.1000 |
| 152.5161 | 0.0000 | 62.6000 | 0 |
| 152.5158 | 0.6515 | 62.6000 | 0.1000 |
| 152.5149 | 1.3030 | 62.6000 | 0.2000 |
| 152.5134 | 1.9546 | 62.6000 | 0.3000 |
| 152.5114 | 2.6061 | 62.6000 | 0.4000 |
| 152.5087 | 3.2576 | 62.6000 | 0.5000 |

To find the roll angle or $\gamma$, the camera calibration equation is used to solve for the only unknown parameter. The camera calibration equation is defined as:

$$\begin{bmatrix} x \\ y \\ z \end{bmatrix} = KRT \begin{bmatrix} X \\ Y \\ Z \end{bmatrix} \tag{1}$$

where X, Y, and Z are the camera coordinate system and the coordinates (x/z, y/z) are the image coordinates. The K parameter is the matrix of the camera intrinsic parameters as shown in equation (2):

$$K = \begin{bmatrix} \dfrac{-f}{\text{pixel Size}} & 0 & axisX \\ 0 & \dfrac{f}{\text{pixel Size}} & axisY \\ 0 & 0 & 1 \end{bmatrix} \tag{2}$$

where f is the focal length, axisX and axisY are the coordinates of the principal point. The matrix R is the combination of three rotational matrices shown in equation (3):

$$R = R_y R_z R_x = \begin{bmatrix} \cos\gamma & \sin\gamma & 0 \\ -\sin\gamma & \cos\gamma & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix} \tag{3}$$

where parameters $\alpha$, $\beta$ and $\gamma$ represent the angles of rotation around the camera coordinate system axes X, Y, and Z, respectively. The matrix T is the translation matrix shown in equation (4):

$$T = \begin{bmatrix} 1 & 0 & 0 & t_1 \\ 0 & 1 & 0 & t_2 \\ 0 & 0 & 1 & t_3 \end{bmatrix} \tag{4}$$

where $t_1$, $t_2$, and $t_3$ are the translations along the X, Y, and Z axes. Assuming the world coordinates of the central vanishing point on the ground plane of the camera coordinate system to be X=0, Y=∞, Z=0, the projection in the image plane (cvpX=image x coordinate of the central vanishing point in the image plane) is already estimated. Thus, for the projection of the central vanishing point onto the image plane, x=cvpX and y=cvpY. Note that the world coordinates of the central vanishing point are independent of the camera's position with respect to the vehicle.

Replacing K, R, and T in equation (1) with known α, β, X, Y, Z, x, and y, results in equation (5) in which only the roll angle V is unknown.

$$A \cos \gamma + B \sin \gamma = C \quad (5)$$

where,
A=f sin α sin β
B=f cos α
C=(cvpX−axisX)sin α cos β

By solving the sinusoidal equation, the last rotation angle or roll angle or IP is estimated.

III. Rear Camera

The approach for the rear camera 12b may be similar to the approach for the front camera 12a discussed above. However, the ROI location will be different since the tracking direction is the opposite of the front camera. And the angle/distance lookup table will also be different due to the different geometries involved. Optionally, the rear camera may be calibrated by processing the overlapping image data based on a calibrated sideview camera, such as in a similar manner as discussed below with respect to the calibration of the sideview cameras.

IV. Side Cameras

Figure 20:
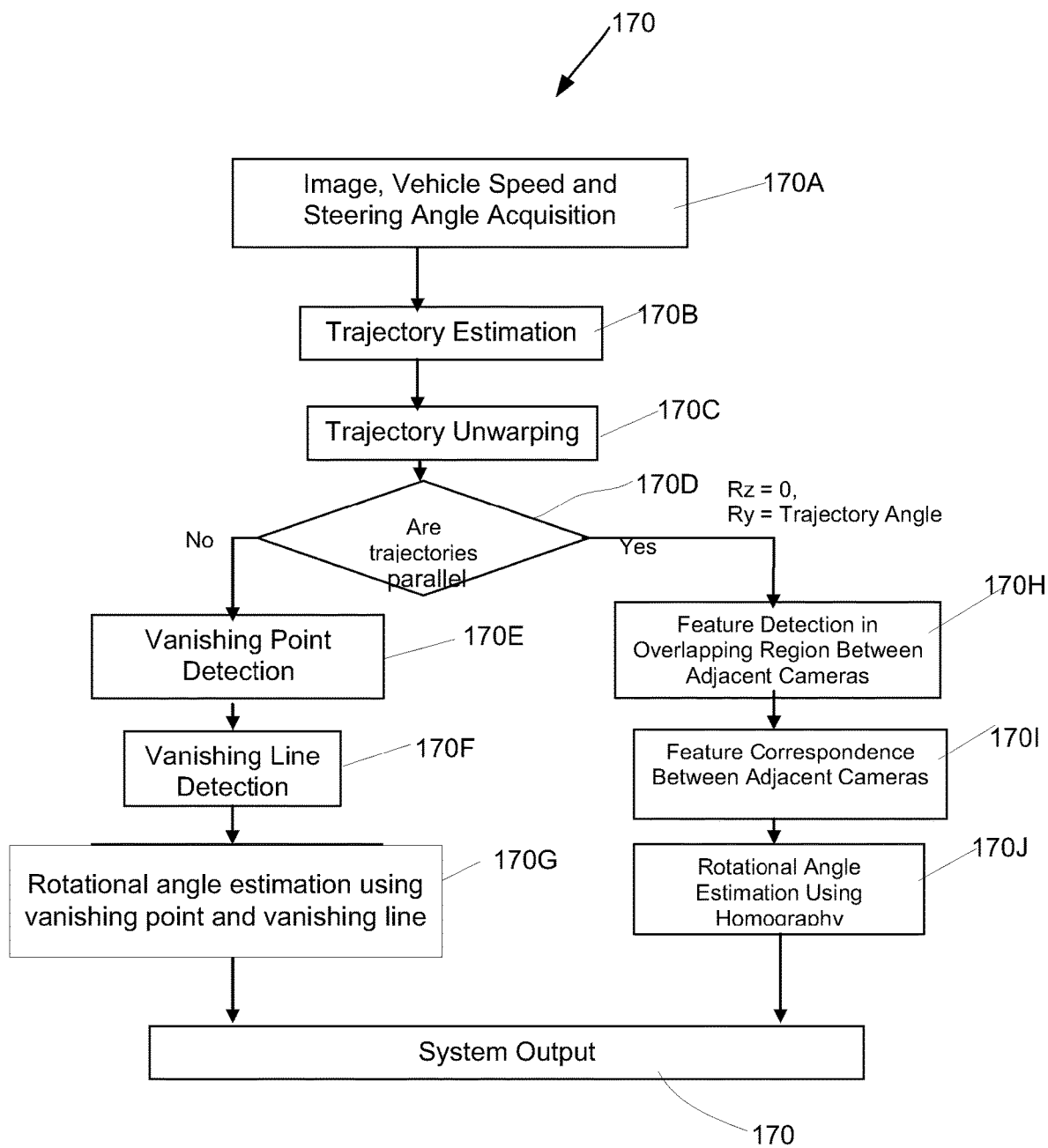
FIG. 20 is a block diagram of an online calibration algorithm executed by the 360 degree vision system for dynamically ascertaining the position, including angular rotations, of the side cameras.

The side cameras 12c, 12d, which are installed in the mirrors on the side of the vehicle, also need to be calibrated online during the life cycle of the system 100 to assure the seamless stitching of the images captured by all four cameras. In the following the concept behind the overall algorithm 170, shown in FIG. 20, is discussed using the right side camera as an example.

In the case where the rotation of the camera around the Z-axis (Rz) is non-zero then, as indicated by the left side of the condition at 170D, it is feasible to use an algorithm similar to the OC algorithm 150 for front and rear cameras to calibrate the side cameras. However, in the case where Rz=0, then the initial processing of the image data would indicate that the estimated trajectories are parallel and this itself is sufficient to estimate Rz and Ry. However, since the estimated trajectories are all parallel to each other, there is no valid intersection which would allow for the estimation of Rx (the angle at which the camera is pointing at the ground). Thus, for the estimation of Rx, the below aspect of the invention is suitable for use.

A. Non-Parallel Motion Trajectories

Figure 21:
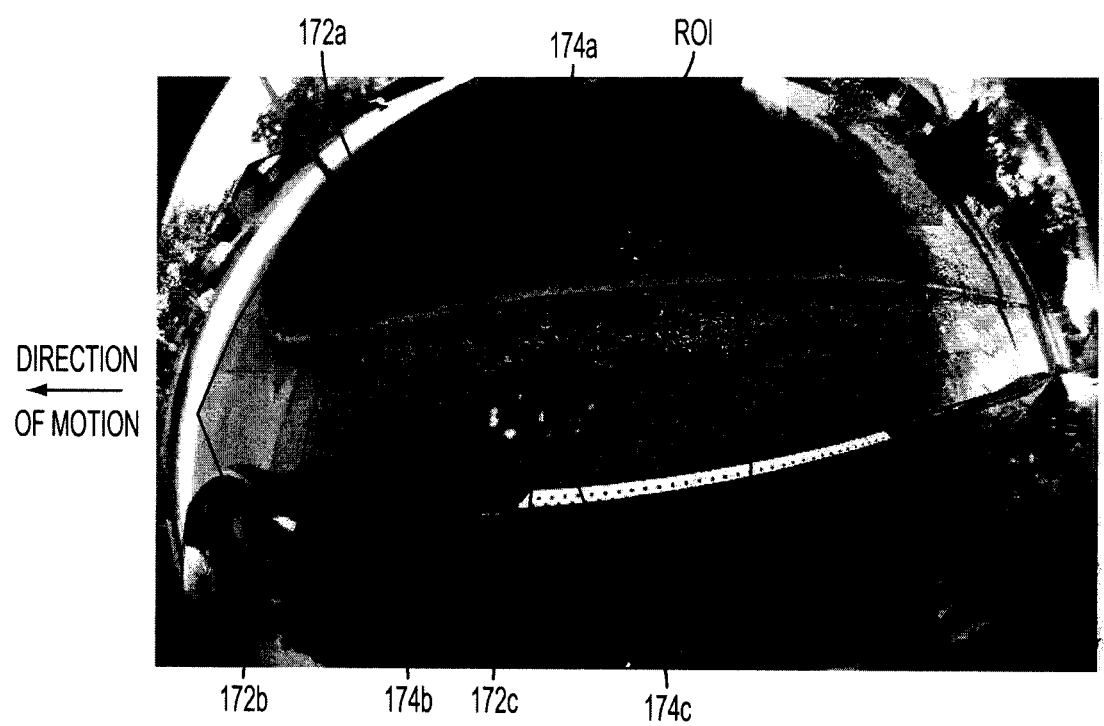
FIG. 21 is an image showing the motion trajectories of feature points over successive image frames in a video stream provided by one of the side cameras.

In the case where Rz #0, steps 170E and 170F for detecting vanishing points and the vanishing line resemble that of steps 154 and 156 of the OC algorithm 150 shown in FIG. 9. For example, in the coordinate system defined in FIG. 21, the instantaneous vehicle motion is along the vehicular −X axis and the camera is mounted on the side of vehicle observing the scene, so the side camera points in the direction of the vehicular +Y axis. Feature points are selected and tracked over a set of image frames. For instance, feature points 172a, 172b, 172c were tracked in a previous frame and points 174a, 174b, 174c indicate the locations of the respective feature points in the image plane. A set of parallel lines in the real world in the direction of the motion of the vehicle (parallel to the vehicular X-axis), when projected back to the image plane, will also intersect at a central vanishing point, although the location of this point in the side camera image plane will vary considerably in comparison to the central vanishing point of the front-facing camera.

Figure 22:
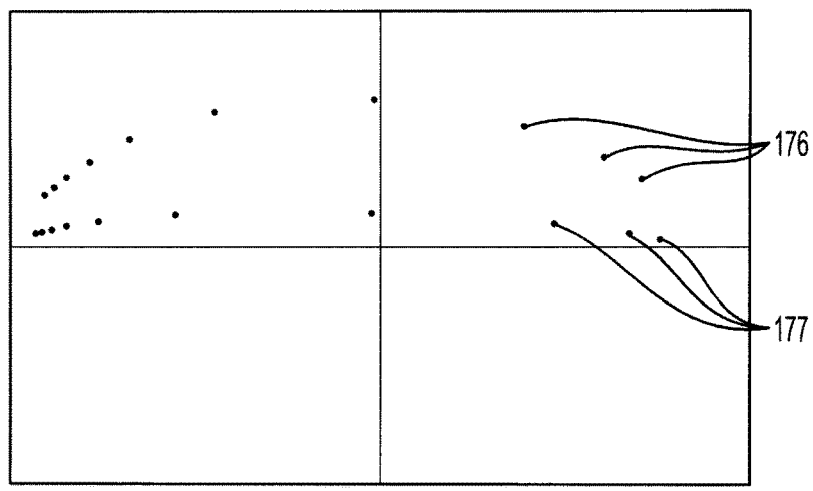
FIG. 22 is another plot showing the motion trajectories of various feature points in an image plane provided by one of the side cameras.
Figure 23:
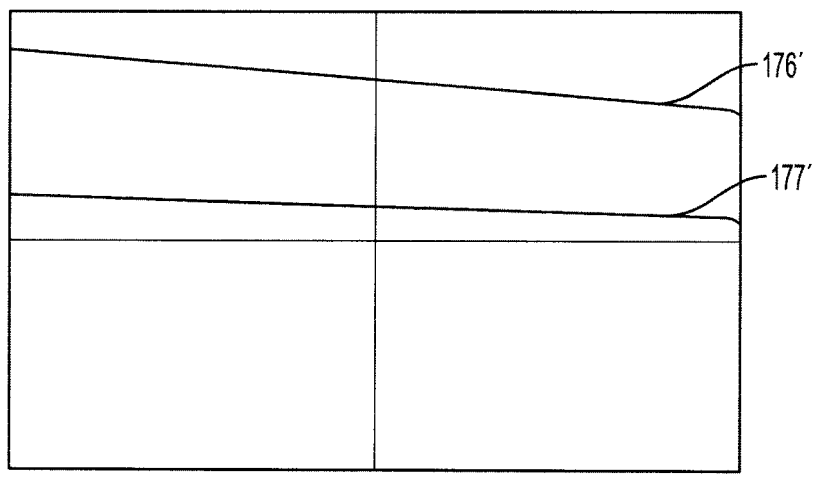
FIG. 23 is a diagram showing linearly fitted, dewarped motion trajectories of FIG. 22, having an intersection point outside of the image frame.
Figure 24:
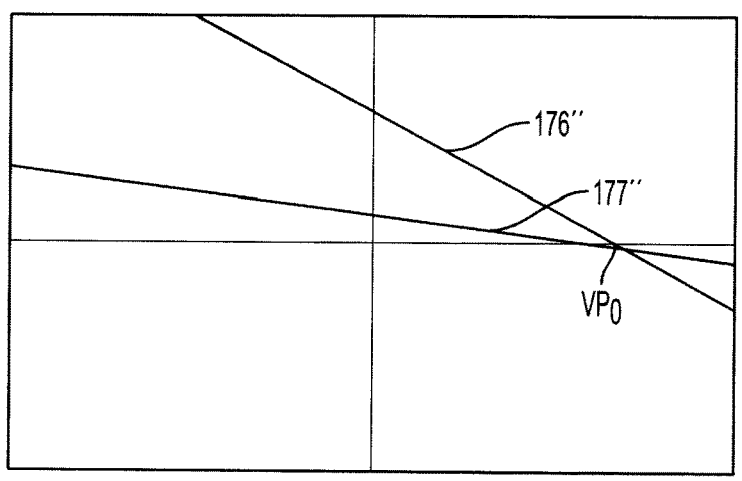
FIG. 24 is a diagram showing another example of linearly fitted, dewarped motion trajectories having an intersection point within the image frame.

For example, and with reference to the schematic diagram of FIG. 22, which shows an image plane provided by the side camera, the motion trajectories 176, 177 of two feature points are tracked and recorded in the image plane. FIG. 23 shows the trajectories 176, 177 after being dewarped and regression-fitted to yield two lines 176', 177'. Since the Rz angle is typically low, the central vanishing point will lies outside the image frame. However, thus, to present the vanishing point in a more convenient fashion, FIG. 24 presents a higher Rz angle to simulate the intersection of two dewarped, regression-fitted trajectories 176", 177" (this is done simply for visual convenience as the principle and the mathematics behind the approach remains the same). The intersection of these lines leads to the detection of the central vanishing point $VP_0$ for the side camera.

Figure 25:
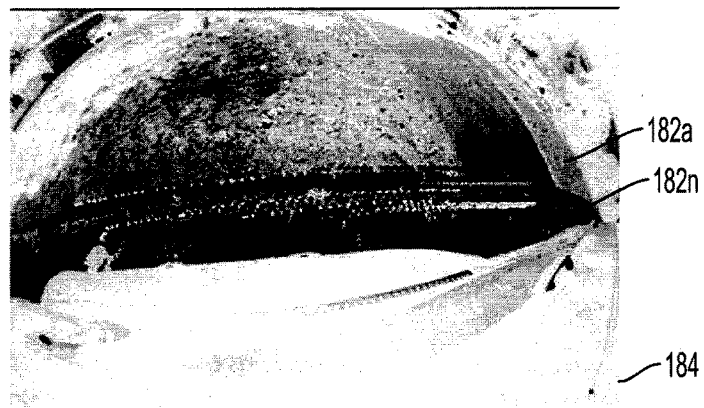
FIG. 25 is an image showing the motion trajectories of feature points over successive image frames in another video stream provided by one of the side cameras.
Figure 26:
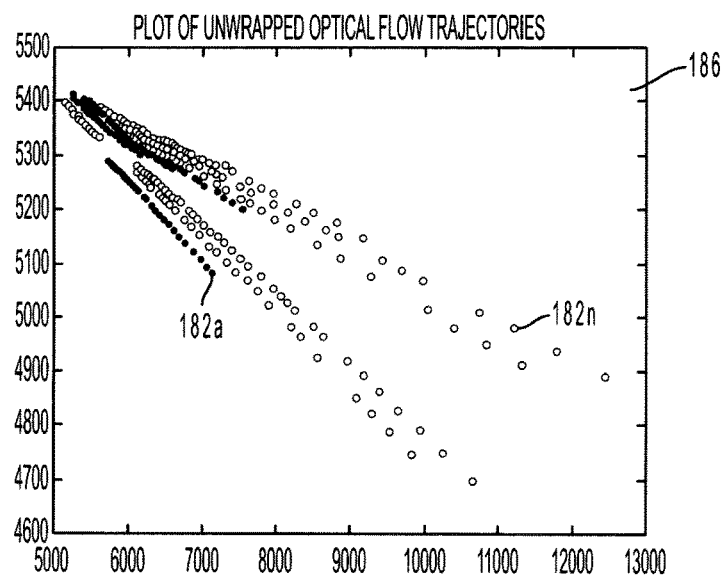
FIG. 26 is a diagram showing dewarped motion trajectories of FIG. 25.
Figure 27:
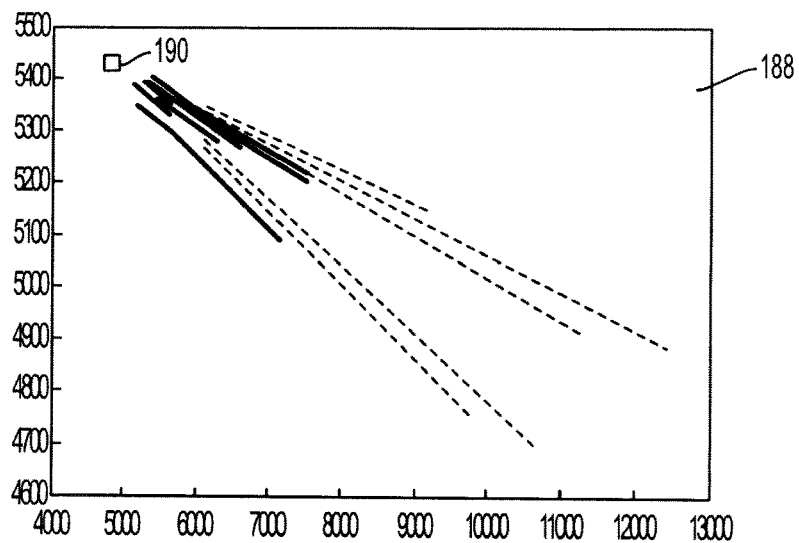
FIG. 27 is a diagram showing linearly fitted, dewarped motion trajectories of FIG. 25, and the location of a vanishing point based on the intersection of such trajectories.

Another example of this phenomenon is shown in FIG. 25, where several features are tracked over a short period of time in a real video sequence 184 and their corresponding motion trajectories 182a ... 182n are noted. As will be seen in FIGS. 26 and 27, the motion trajectories 182a ... 182n are dewarped in plot 186 and be fitted using straight lines 182a' ... 182n' in plot 188. The intersection of these lines leads to the detection of the side camera central vanishing point 190 (note that the trajectories in FIGS. 26 and 27 look upside down when compared to the ones plotted in FIG. 25 because the directions of the Y-axis are reversed in the image frames of the video sequence 184 and the plots 186, 188).

As in the case of the front camera, tracking the motion trajectories of various features over different steering angles for a short period of time or distance will yield different vanishing points, from which a vanishing line for the side camera can be estimated.

Figure 28:
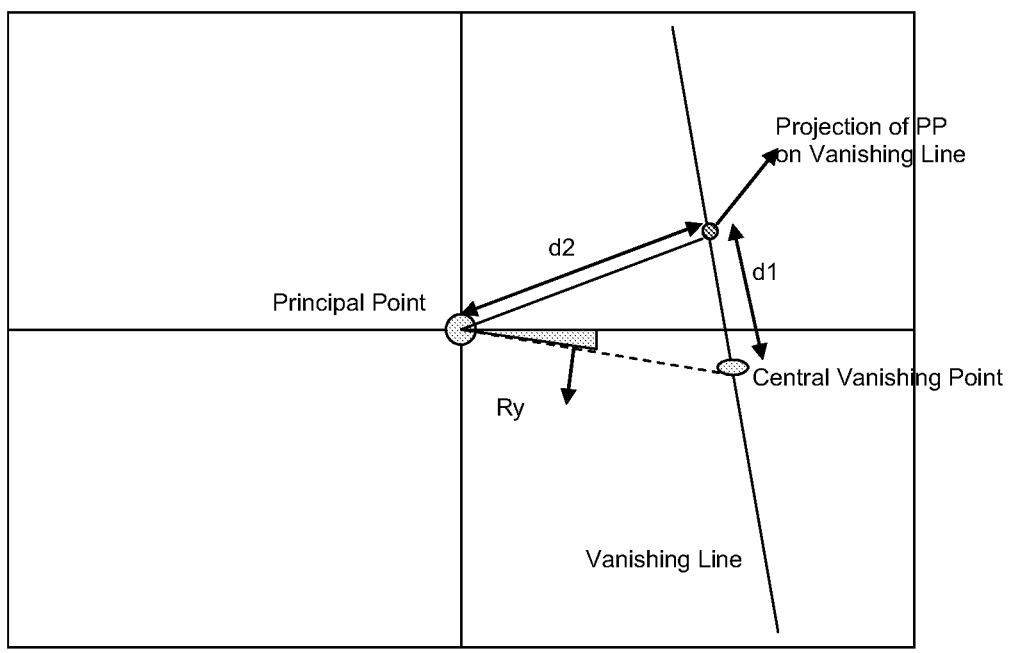
FIG. 28 is a diagram showing various vanishing point and vanishing line parameters in the image plane which are used by a rotational angle estimation algorithm for the side cameras.

The combination of the central vanishing point (for the zero degree steering heading) and the vanishing line can then be used to determine the three rotation angles as illustrated in FIG. 28. As before, the $R_x$ and $R_z$ angles are a function of the two projected distances, $d_1$ and $d_2$. In this situation, however, it was discovered that due to the spatial relationships between the vehicle side camera and vehicular coordinate axis, the $R_y$ angle can be conveniently determined by simply measuring the angle projected by the central vanishing point on the image horizontal.

B. Parallel Motion Trajectories

Figure 31:
FIGS. 31 and 32 show images captured by the front and side camera respectively which include overlapping regions.
Figure 32:
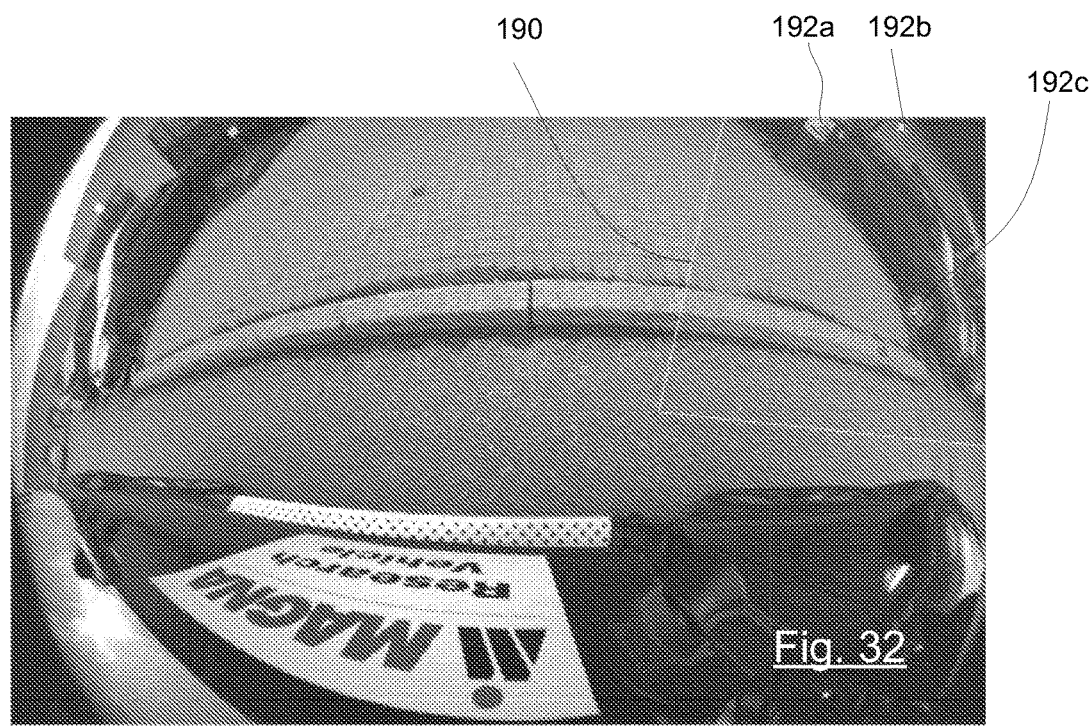

In the case where Rz=0, the detected trajectories are estimated to be parallel or almost parallel, in which case the detection of the Rx angle is not feasible using the vanishing line algorithm described above. This is because of the fact that the parallel trajectories do not have a valid intersection point and thus, cannot be used to estimate Rx. Instead, we exploit the overlapping region between the side cameras and the front (or rear) camera. For example, FIGS. 31 and 32 show the simultaneous capture of the same scene 190 using the front camera (FIG. 31) and side camera (FIG. 32).

In the case where Rz=0, the algorithm 170 (FIG. 20) follows the right branch of the condition at step 170D and works by identifying at steps 170H and 170I corresponding feature points 192a-c, which are visible in both (front and side) views of the same scene or region 190. Since the front (or rear) camera is already calibrated using the independent calibration algorithm 150, the physical location of the features 192a-c in the front (or rear) view (such as shown in FIG. 31) can be computed accurately with respect to the vehicle coordinate system. Since the real physical location of these features 192a-c is the same even when viewed by the side camera, the precise physical locations of the several feature points 192a-c in the side camera is thus known. Based on the known locations of the feature points and thus the expected pixel location of those points in the side camera's imaging array, the system may readily determine if the actual feature points as detected are at the expected location. If the detected feature points in the captured images are at the expected locations, then the system determines that the side camera is calibrated. If the detected feature points in the captured images are not at the expected locations (and are outside of a threshold distance or number of pixels from the expected locations), then the system determines that the side camera is not calibrated and may adjust the image processing accordingly.

The system thus can use the object location as detected by the calibrated forward facing camera to determine the calibration or alignment or misalignment of the sideward facing camera by processing the image data of the overlap area of the two cameras. For example, given the fact that both the pixel location and the physical location of several points are known for a particular side camera, the rotational angles are computed at step 170J using homography. Let x represent the set of pixels whose corresponding pixels were located in both of the views, x' as the location of the un-warped pixels and X as the set of physical locations in the vehicle coordinate system.

In other words, define x: $\{(x_1, y_1), (x_2, y_2), (x_3, y_3), \ldots\}$, where $(x_1, y_1)$ is the location of the $i^{th}$ pixel for the $i^{th}$ feature point, and x': $\{(x_1', y_1'), (x_2', y_2'), (x_3', y_3'), \ldots\}$, where $(x_1', y_1')$ is the location of the $i^{th}$ pixel for the $i^{th}$ feature point in the dewarped space. Then, $$X=Hx', \qquad (6)$$

where H is the homography matrix.

Given the fact that the correspondences can be collected over a period of time, we end up with an over-determined system in which there is ample data which can be used to estimate the rotational matrix represented in the homography.

Thus, this is a more generic approach for the estimation of the rotational angles of the side cameras which uses the overlap between the side and front (or rear) cameras and based on the physical location of the corresponding features, optimally estimates the rotational parameters which define the side camera.

However, this approach is not the sole one which is used for the angle estimation of the side cameras. To enhance the accuracy of the system, this approach may be conditioned upon the accuracy of the angles estimated for the front or the rear cameras. Any error in the estimation of those estimations would thus propagate to the estimation of the angles for the side cameras. Furthermore, this approach can work alongside the approach using vanishing points to have a redundant system whose accuracy could be self-verified and which would lead to a much more confident and accurate system.

The foregoing description has described how the algorithm for the front camera uses motion tracking to detect vanishing points for different steering angles. Once the vanishing line is constructed, the camera rotational angles are estimated using the geometrical properties of the vanishing line and the spatial location of the principal point in the image plane. The detection of key features allows for only a very limited amount of tracking (motion estimation). The trajectories estimated are more reliable owing to longer detection and the easy tracking of the key detected features. This approach allows for more flexibility as the number of frames for tracking trajectories can be reduced or increased based on algorithm input. For the side cameras, an additional redundancy is built into the processing which allows for more robust systems. The side camera algorithm accounts for the difficulty in estimation of the Rx angle by using the overlap between the two views of the same scene from the side and the front (or rear) cameras.

Thus, the present invention provides an online calibration (OC) method or system for automatically calibrating the forward, rearward and/or sideward facing cameras of a vehicle, after the vehicle has left the assembly plant and is being driven along a road. The online calibration of the front and/or rear cameras may be accomplished at any time by estimating vanishing points using relative motion between the vehicle and different feature points in the field of view, and using a locus of these vanishing points obtained during the turning of the vehicle to estimate the vanishing line, and estimating rotational angles using the camera intrinsic data and the estimated vanishing point and line.

However, and as can be seen in the likes of FIG. 32, a vanishing point technique is not suitable for online calibration of either of the side mounted cameras (that typically are included in the respective sideview mirror assemblies at the driver and passenger sides of the vehicle), which have a field of view that is generally mostly downward and that includes a considerable amount or portion of the side of the vehicle. Although the side of the vehicle can be useful in calibration of an exterior mirror mounted camera (such as described in U.S. Pat. Nos. 7,991,522; 7,877,175 and 7,720,580, which are hereby incorporated herein by reference in their entireties), some OEMs or automakers may favor an online calibration system or method that is agnostic as to the shape or form or condition of the side of the vehicle. This is because different models of vehicles (for example, a Mercedes M-class SUV compared to a Mercedes S-Class luxury sedan) will have different profiles and styling, and some OEMs prefer an online calibration system/software that is usable across that OEMs entire model lineup, without need to customize the calibration system/software for any particular model/vehicle thereof. Furthermore, should the side of the vehicle imaged by the likes of the driver or passenger side camera be damaged or changed during the lifetime or use of the vehicle, this can potentially impact a calibration system that relies at least in part on referencing to the imaged side of the vehicle.

Because the field of view of the side cameras is principally downward and principally sideward of the vehicle, application of an online calibration algorithm or approach that may work well for online calibration of a front or rear camera of the vehicle may not work well for either of the side cameras. The side cameras, like the front and rear cameras, on a given vehicle are preferably equipped with a wide angle lens, most preferably with a lens that provides around a 185 degree or thereabouts field of view, so that the field of view of, for example, the driver side camera overlaps with the field of view of the front camera and the field of view of the rear camera. Thus, in the respective overlapping region, the respective images may be seamlessly or substantially seamlessly merged, preferably in a top view or bird's eye view format or manner, utilizing techniques such as described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62755, filed Dec. 1, 2011, and/or U.S. patent application Ser. No. 13/333,337, filed Dec. 21, 2011, now U.S. Pat. No. 9,264,672, and/or U.S. provisional applications, Ser. No. 61/615, 410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

In accordance with the present invention, the overlapping region between the driver side camera and the front camera (or rear camera) and the overlapping region between the passenger side camera and the front camera (or rear camera) may be used to calibrate the side viewing cameras without recourse to estimation of the likes of vanishing points or lines and the like. For example, the overlapping region between the adjacent cameras may be used to calibrate the sideward viewing cameras, such as via detecting or determining corresponding features between overlapping regions and using these corresponding features to adjust the relative calibration of the different cameras. Of course, but less preferably, the rear camera (and overlapping region of the side camera field of view and the rear camera field of view) could be used to calibrate one or both of the side cameras in a similar manner.

As discussed above, the forward facing camera (or optionally the rearward facing camera) may be calibrated via processing of image data to determine a pixel location of the vanishing point of perspective lines as the vehicle travels along a road. When the forward facing camera is thus properly calibrated, the vanishing point pixel location is known (based on the initial end of line highly accurate calibration of the forward facing camera at the vehicle assembly plant), and the system is operable to process image data captured by the forward facing camera to determine if the current or determined vanishing point is at the expected pixel location in the captured images. If the determined vanishing point is at the expected pixel location (or within a threshold number of pixels or degrees from the expected pixel location), the system determines that the camera is calibrated to within an acceptable threshold or tolerance level. If the determined vanishing point is not at the expected pixel location (or is more than a threshold number of pixels or degrees away from the expected pixel location), the system may shift the image processing to "re-center" or align the camera.

Such a vanishing point based calibration method does not work as well for sideview cameras, such as indicated previously and as shown by comparison of FIG. 31 and FIG. 32, which show that what is seen by the front camera is radically different than what is seen by the side camera. The side view camera is particularly effective at looking at the ground and so is good at picking out the likes of curbs and other such ground level features. Thus, the present invention processes the overlap region of the fields of view of the forward facing camera and the sideward facing camera (by detecting objects or features, such as a curb or other ground level features, that transition from the front camera field of view to the side camera field of view through the overlap region) to determine if the sideward facing camera is calibrated or aligned and to correct for any misalignment or threshold degree of misalignment that may be determined from such processing.

Thus, when the forward facing camera is properly calibrated or aligned, the system may process the overlap regions of the fields of view of the forward facing camera and one or both sideward facing cameras. For example, and with reference to FIGS. 31 and 32, when an object (such as a vehicle or mailbox or a sign or a pole or a curb or the like at a side and forward of the vehicle) is detected in the forward facing camera's field of view, the system will also, as the subject or host or equipped vehicle approaches the object, detect the object in the side camera's field of view, and at an overlapping region of the side camera's field of view and the front camera's field of view (note the overlapping area 190 in FIGS. 31 and 32). Based on the original end of assembly line calibration at the vehicle assembly plant (or recent calibration or confirmed calibration of the front camera), the system, responsive to a determination of the location of the object in the front camera's field of view, knows where the object should appear in the side camera's field of view (such as a pixel coordinate or the like) when the object transitions from the front field of view to the side field of view and is in the overlapping area of the front and side camera's fields of view.

Thus, for online calibration of a side camera, taking for example, the driver side camera, an overlap calibration routine can be deployed as follows: First, the calibration of the forward facing camera is assured or confirmed, such as by a recalibration of the front camera or verification of the calibration of the front camera, such as by utilizing the likes of the aforementioned/described vanishing point technique. Now, with an assured forward facing camera calibration (i.e., a "gold standard" calibration for the front camera), an object (such as a curb or curbside mailbox or the like) is identified ahead of the vehicle as the vehicle moves forward. Initially, the identified object or feature is in the forward field of view of the forward facing camera, and, as the vehicle continues to travel forward, the identified object or feature transitions into the overlap region, where it is seen by both the front and driver side cameras. From an original end of line calibration or equivalent, the expected location in the video image frames captured by the sideview camera of the object or feature transitioning through the overlap region from a properly calibrated front camera is a defined known location (such as a defined pixel location or pixel coordinates or group of pixels). At that moment in time, the system can analyze or process the video data/frames being captured by the sideview camera and can determine where in the captured frames the object of interest (such as, for example, a curb or the like) is actually occurring at that moment in time.

Then, by straightforward comparison of where in the frame (i.e. what pixel or pixel coordinates or pixel group) the object of interest is actually occurring to where the object of interest should occur in a properly calibrated side camera, the system can readily estimate or determine whether or not the side camera is in or out of calibration and, if the side camera is out of calibration, the system can further determine by how much the side camera is out of calibration (such as by a number of degrees or pixels). Knowing this, an image shift or an equivalent image processing adjustment can be made to the image or image data or image processing to calibrate the sideview camera, so an online calibration of the sideview camera is achieved using the overlap calibration technique of the present invention without recourse to or need of vanishing point techniques or the like. By providing a known calibrated front camera ("the gold standard calibration") and by calculating where in the overlap region the object of interest that is transitioning therethrough from the front camera to where it should be versus where it is in the side camera's field of view, the present invention determines whether or not the side camera is calibrated (to within a desired or predetermined threshold level) and can adjust the images or image data or image processing to account for any determined misalignment of the side camera.

Thus, the system detects the object in the front camera's field of view and, as the vehicle continues to move forward, the object enters the side camera's field of view (at the overlap region of the fields of view of the adjacent cameras), and the system can determine if the object (as detected by the side camera) is at the expected location (such as a pixel location of the imaging array of the side camera) and thus can determine if the side camera is calibrated or aligned properly or within a threshold level of alignment. If the object is not at the expected pixel location or coordinates in the sideward camera's field of view, the system or processor may shift the images or image processing to accommodate the misalignment and to thus calibrate the sideward facing camera or cameras (such that the expected pixel location corresponds to the detected location of the object in the overlapping region of the side camera's field of view). For example, if the object or feature point (as detected in the front camera's field of view and at the overlapping region) is expected to be detected by the side camera at pixel coordinates 150, 380 (pixel coordinates of the imaging array of the side camera), but the object or feature point is determined to be detected by the side camera at pixel coordinates 160, 385, then the system shifts the expected pixel coordinates to the right ten pixels and up five pixels to correspond with the actual detected location of the object or feature point in the side camera's imaging array. Thus, the system electronically calibrates the side camera via adjustment of image processing of the image data captured by the side camera and based on image data captured by a properly calibrated front camera or forward facing camera.

Optionally, the vision system may include a triggering module that triggers or commences the calibration process if the trigger module detects that one of the front, rear and side cameras is out of calibration or misaligned by more than a threshold degree or amount. When the triggering module detects such a misalignment of one or more of the cameras, the OC system operates to calibrate the cameras back to within a predetermined threshold level of alignment or misalignment. A termination module may function to determine when the cameras are calibrated to within the threshold level and may stop the calibration process and reset the triggering module. The threshold level of misalignment upon detection of which the triggering module triggers the calibration process is preferably greater than the threshold level of misalignment upon detection of which the termination module stops the calibration process. In other words, the triggering module may not trigger the calibration system until a misalignment of, for example, five degrees or three pixels or the like is detected, while the termination module may not stop the calibration process or cycle until the detected misalignment is, for example, at or less than two degrees or two pixels or the like, such that the cameras are better calibrated or more properly aligned upon completion of the calibration system than they were just prior to the triggering module triggering the calibration system.

Figure 33:
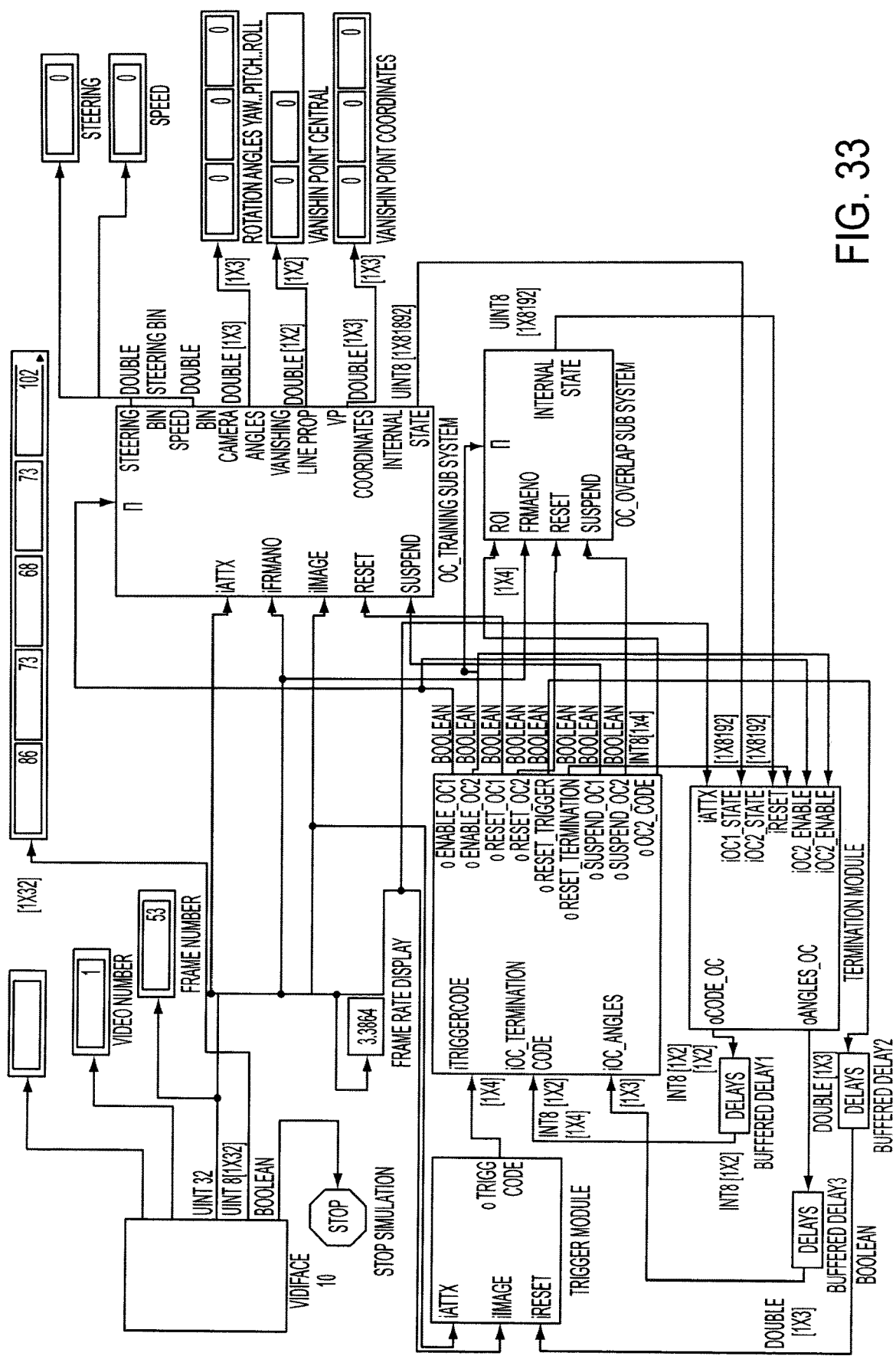
FIG. 33 is a block diagram of an online calibration system or method of the present invention.
Figure 34:
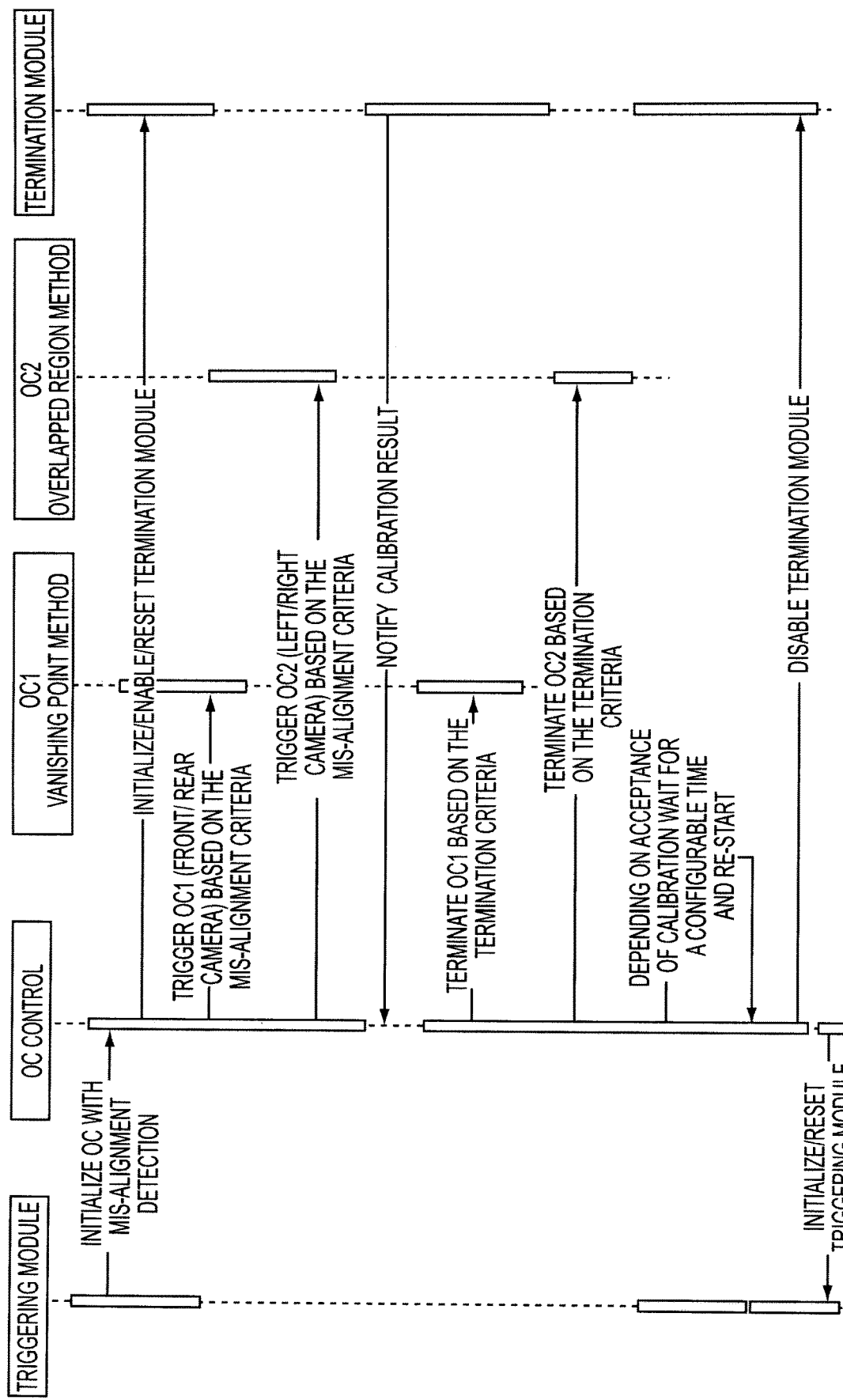
FIG. 34 is an online calibration sequence diagram of the present invention.
Figure 35:
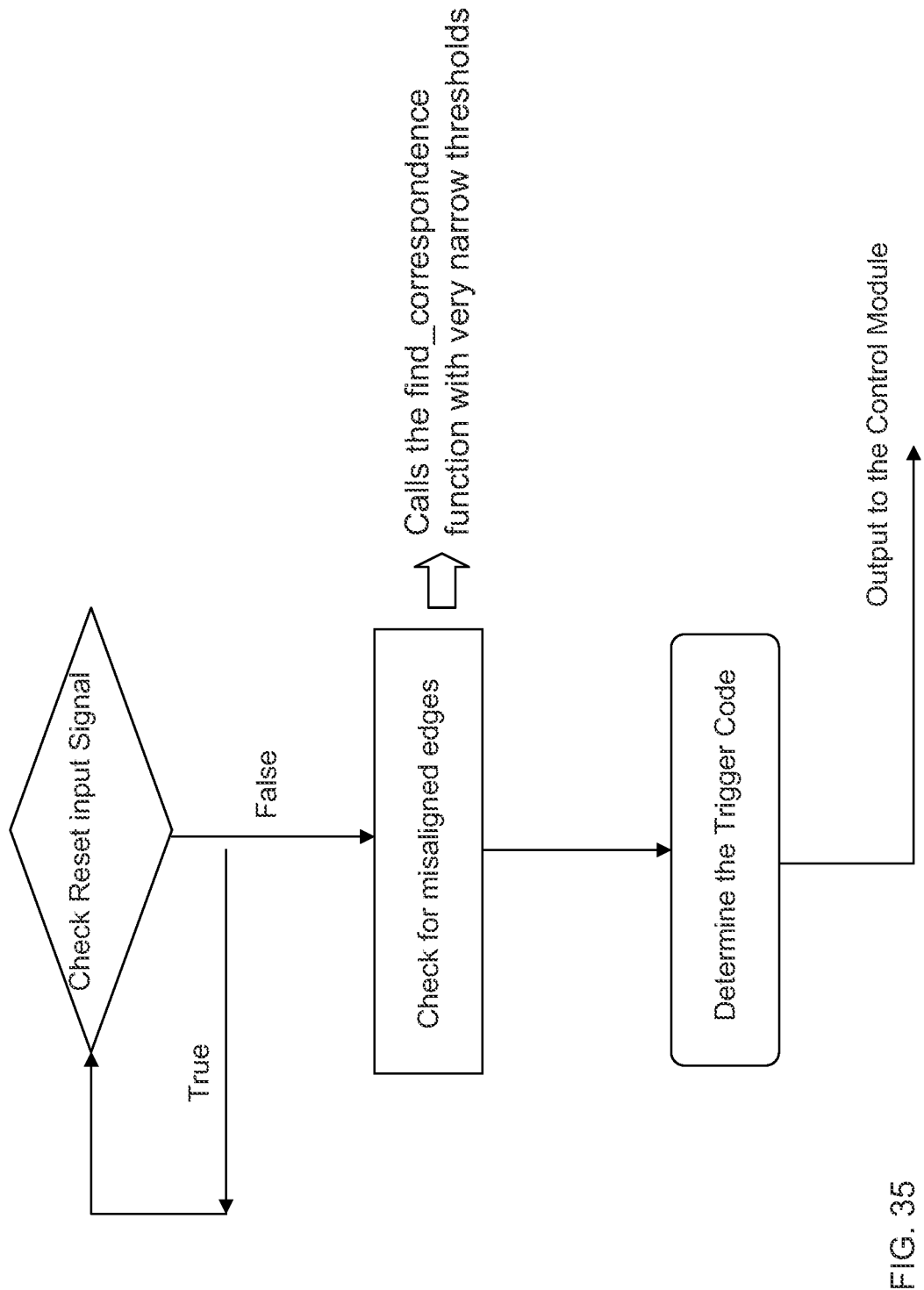
FIG. 35 is a block diagram of a trigger module function of the online calibration system of the present invention.

A block diagram of the OC system or method is shown in FIG. 33 and an OC sequence diagram is shown in FIG. 34. As shown in the sequence diagram, the OC method includes a triggering module and a termination module. Based on the evaluation of the alignment or misalignment of the various cameras, the trigger module generates a misalignment mode which describes the different combinations of the stitched edges that are misaligned. The trigger module receives the four images (or image data from each of the four cameras), video attributes and reset signal as inputs. The trigger module looks at the overlap regions (the image data captured by pixels that correspond to the overlap regions of the cameras as known or predicted for calibrated cameras) and generates a four-element trigger code that shows which edges need to be re-aligned. If the trigger module receives the reset signal from the OC_Control module, it will reset the trigger code to its initial default state. As shown in the diagram of FIG. 35, when the reset signal is not activated, the misalignment for all the edges are checked and based on the results the trigger code is generated and sent to the OC_Controller. A configuration file consists of the necessary parameters for the misalignment function. This configuration is called in OC_Control and also the OC_Overlap subsystem.

FIG. 36 shows a list of states that the trigger module generates based on the results of misalignment. The first column shows the list of edges that are misaligned. Note that the states of rows 2, 3, 5, 6, 9 and 11 should not happen in real time. FD, RD, RP, and FP represent: Front-Driver edge, Rear-Driver Edge, Rear-Passenger Edge, and Front-Passenger Edge.

The termination module, when activated, evaluates the results coming from the activated OC and, based on the results, generates a termination code for the OC_controller. Note that if the reset signal for the termination module is ON, this module resets its internal variables and parameters. The two new inputs for the termination module are the OC enabling signals. In this case, the termination module knows all the time which OC is activated.

Figure 37:
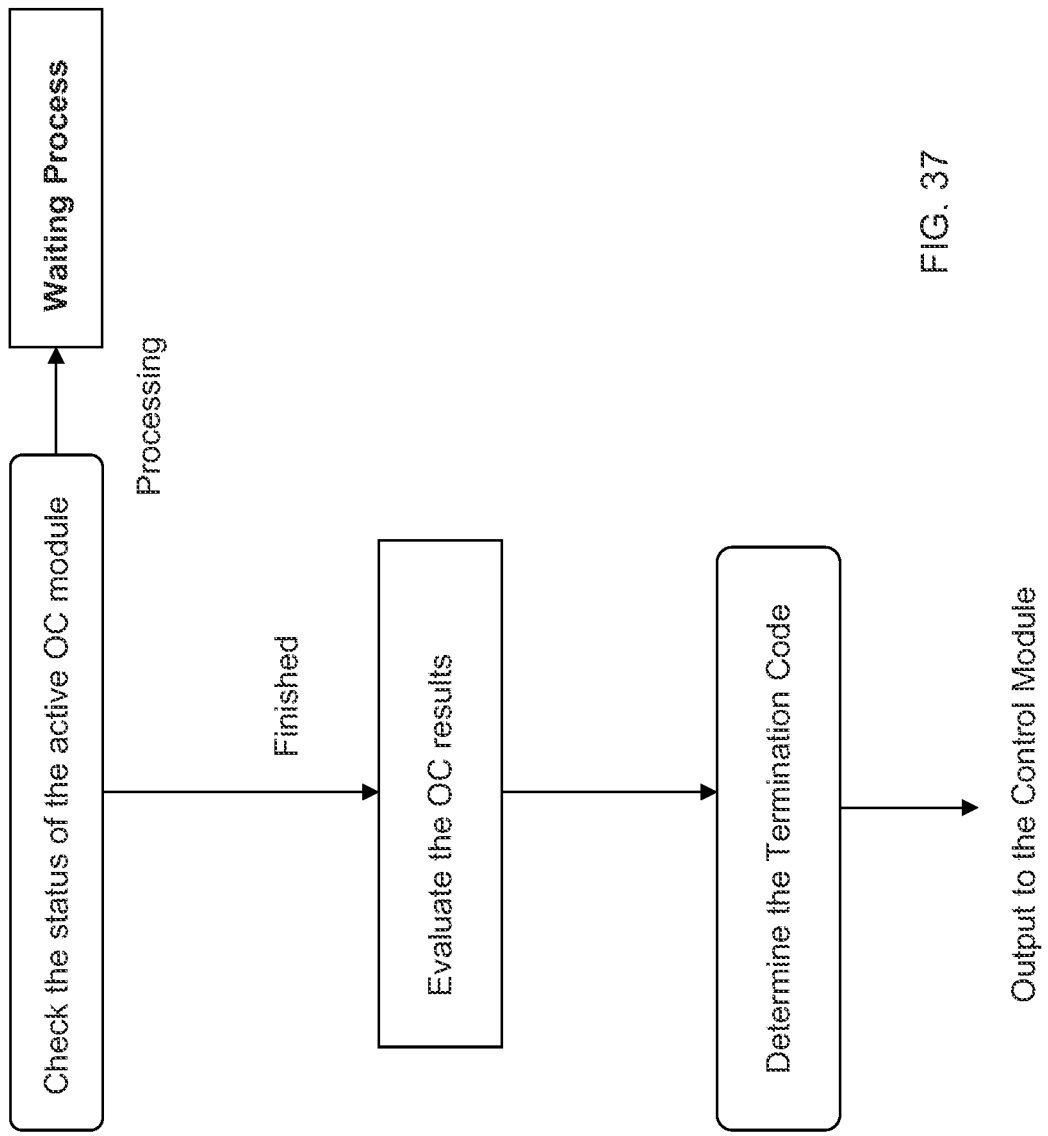
FIG. 37 is a block diagram of a termination module function of the online calibration system of the present invention.

A block diagram of the termination module function is shown in FIG. 37. In the waiting process, the termination module checks the status of the active OC and estimates the time duration. The termination module then estimates if the active OC has produced any result within the set time. If the wait threshold has been reached with no acceptable results, the termination will generate the appropriate code depending on the reason of termination. Once the controller receives the termination code (successful or unsuccessful) it will reset the termination module.

Figure 38A:
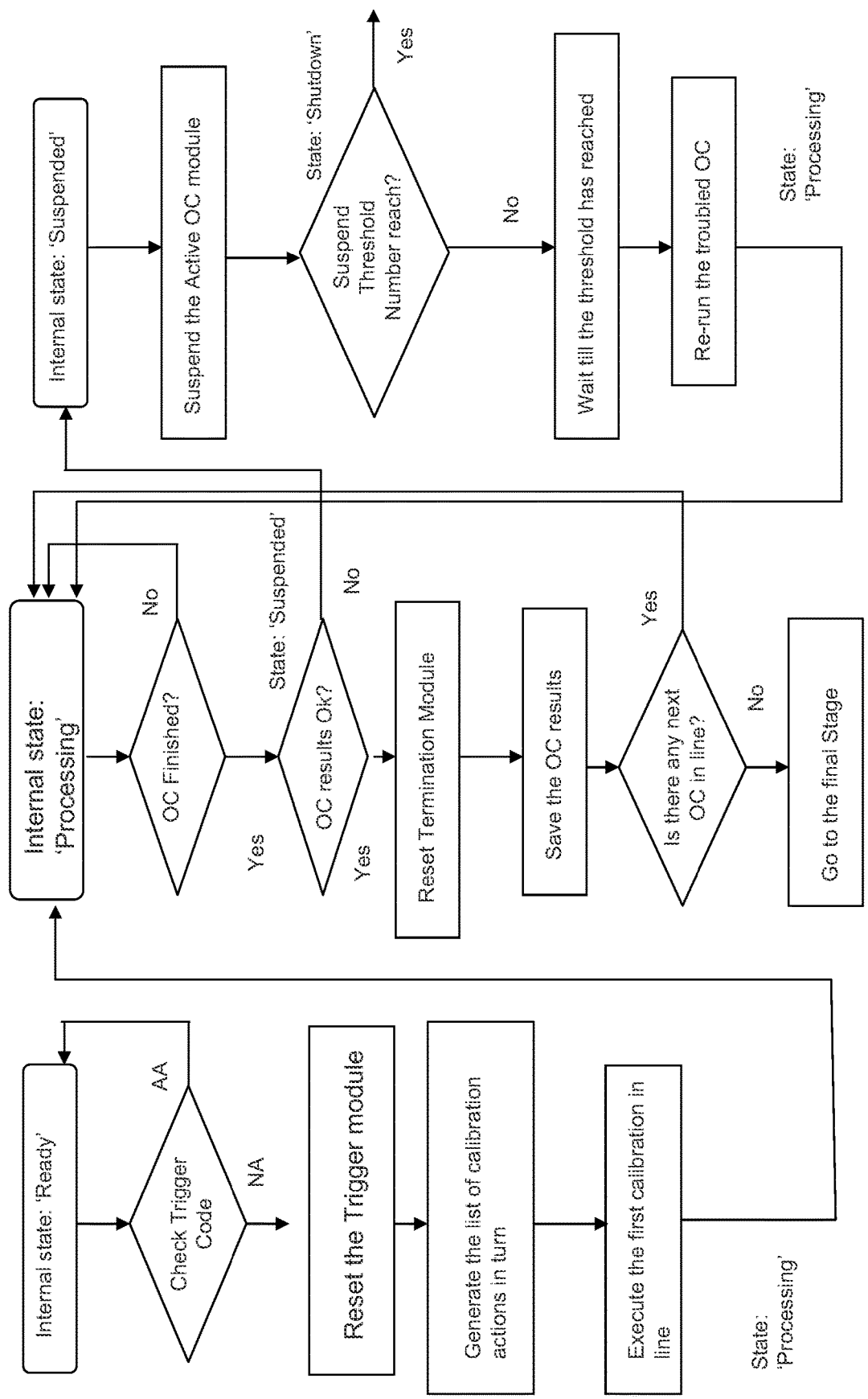
FIGS. 38A and 38B are block diagrams of the online calibration control functions of the present invention.
Figure 38B:
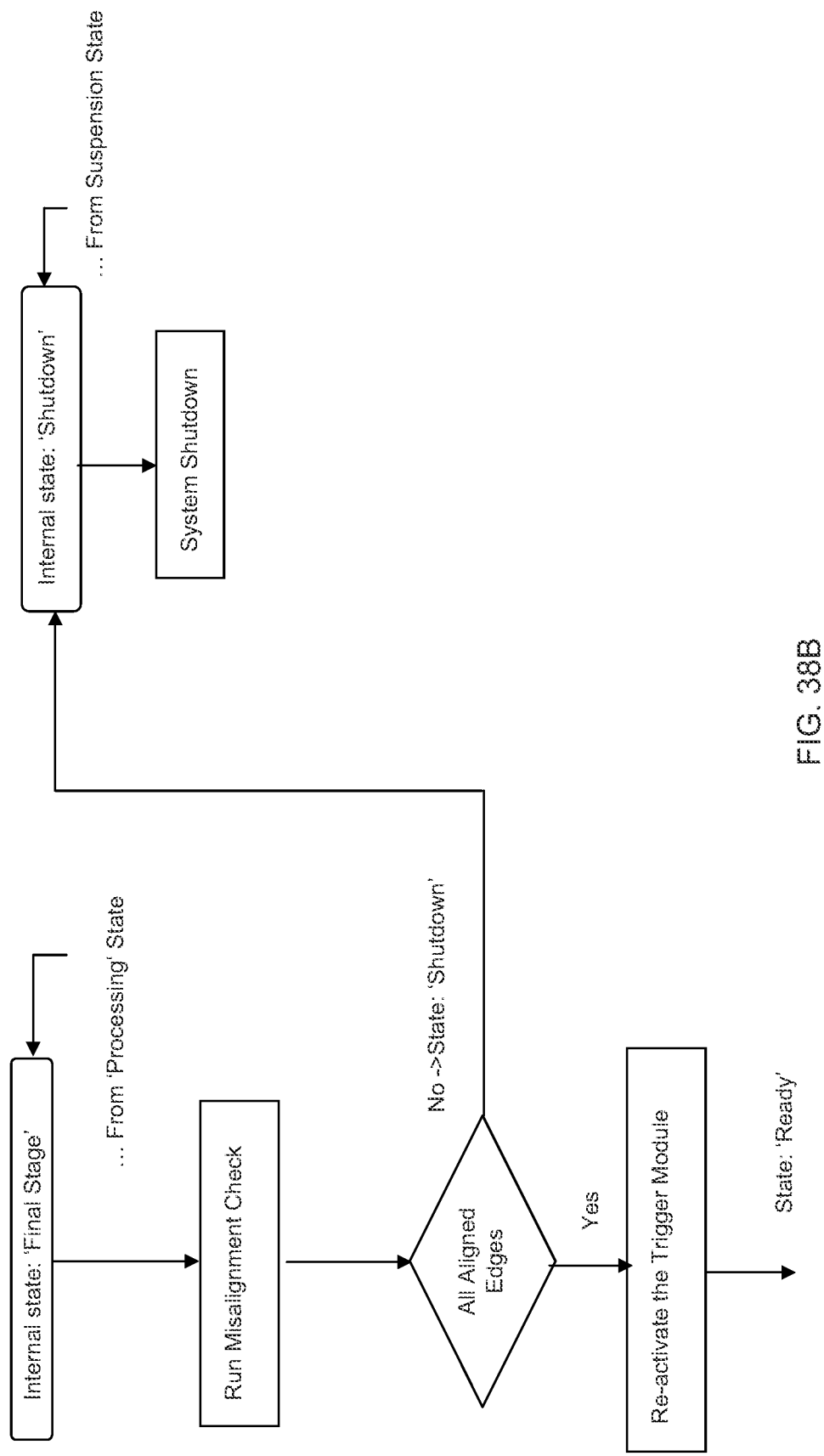

The OC control module controls the overall OC system based on the inputs and output of the overall OC system (feed-back controller). A block diagram of the OC control functions is shown in FIGS. 38A and 38B. Depending on defined states, the OC_Controller functions differently. The different functionalities are defined as 'States.' The states may include, for example, 'Ready', 'Processing', 'Restart', and 'Shutdown'. The number of states may increase when more OC finishing codes are introduced (for example, State 1 (OC finished with stable results) and State 4 (OC is running for a long distance with no results) may comprise finishing codes). When the trigger module sends a trigger code to the controller, it consequently generates a code (Action Code) that decides which OC to run and in which order. This main code is determined based on the pre-defined state tables in the configuration file. It then changes the state to 'Processing'. When the termination module sends a termination code to the controller, the state will change accordingly and depending on the termination code, either the next in line OC will run or the same OC will run after a suspension period or the whole system is shut down. At the final stage when all the necessary calibrations are finished, the OC control checks the four-edge misalignment status and produces the final results. If the calibrations were successful, the system restarts and the trigger module gets activated. Otherwise, the state is set to 'Shutdown'. Additional outputs are OC suspend signals. When the OC system is suspended, it is still active but bypasses the frames until the suspend signal is reset.

Based on the misaligned edges detected by the triggering module, the OC control block determines the sequence of calibration of the different cameras. To generate the proper logic state the OC control may use a table in the configuration file that provides the output state based on the input from the trigger module. An example of such a table is shown in FIG. 39.

Figure 40:
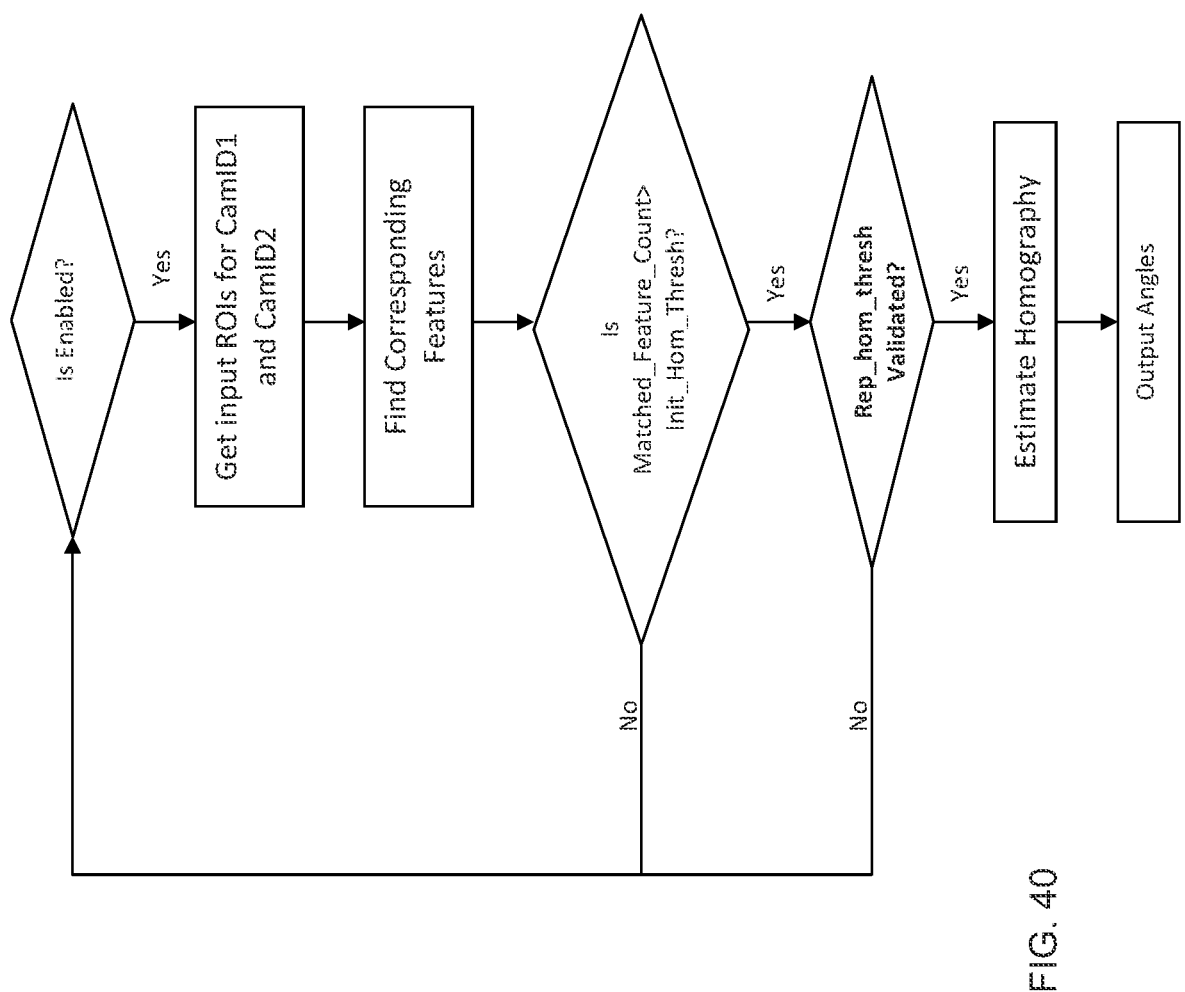
FIG. 40 is a block diagram of the sideward facing camera overlap based calibration method of the present invention.
Figure 41:
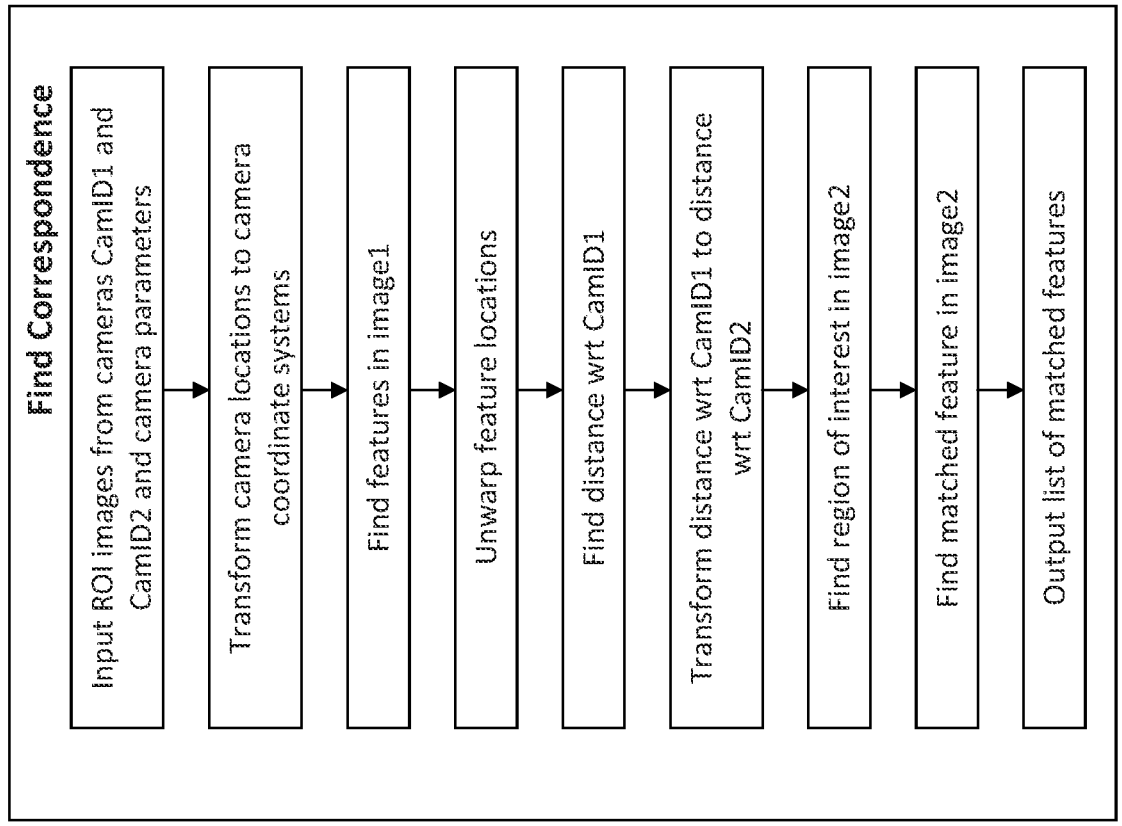
FIG. 41 is a block diagram of the estimation of the corresponding features between two images from two different cameras in accordance with the present invention.

Thus, the present invention provides a means for calibrating sideview or sideward facing cameras at the side of a vehicle (such as disposed at or near an exterior rearview mirror assembly of the vehicle and having a generally downwardly and sidewardly field of view). To calibrate the sideward facing cameras, the present invention processes the overlapping regions in the adjacent camera fields of view (such as in the forward facing camera field of view and the sideward facing camera field of view) and to detect corresponding features and locations thereof in the respective fields of view. Because the front or forward facing camera (or optionally the rear or rearward facing camera) is already calibrated before calibration of the sideward facing camera is commenced, the extrinsic and intrinsic parameters for these cameras are known. A block diagram of the sideward facing camera overlap based calibration method is shown in FIG. 40, while a block diagram of the estimation of the corresponding features between two images from two different cameras is shown in FIG. 41. Using the corresponding features as an input, the system may estimate the homography between the two observed scenes, and using the estimated homography and the known extrinsic parameters of one camera, the system may estimate the rotation matrix and translation matrix for the second camera, and the system may then estimate the Euler angles for the second from the rotation matrix. The system may thus solve the homography to estimate the extrinsic parameters for the unknown cameras.

The present invention may monitor the front, rear and side cameras to determine if a misalignment occurs, and may periodically or episodically or continuously conduct such monitoring. If the system determines that a side camera appears to be misaligned (based on comparison of a location of a detected object in the side camera's field of view to a location of the detected object in the overlapping portion of the front camera's field of view, such as described above), the system may first, before adjusting the image or image processing of the side camera, confirm that the front camera is properly aligned or calibrated, such as via the vanishing point and vanishing line analysis, such as described above. After the system has calibrated the front camera or confirmed that the front camera is calibrated to within a desired or predetermined tolerance level, the system may then recheck the side camera calibration and, if it determines that the side camera still is misaligned, proceed with determining the degree of misalignment of the side camera and calibrating the side camera accordingly. Thus, by first confirming alignment and proper calibration of the front camera before proceeding with calibrating or adjusting the side camera, the system avoids potentially erroneous calibrations or adjustments of the side camera that may otherwise occur if the side camera is adjusted based on comparison of side camera image data to image data captured by a misaligned front camera.

The vision system thus may provide a display of a top-down view or bird's eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62755, filed Dec. 1, 2011, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

The imaging sensors and their photosensor arrays may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensors may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/539,049, filed Sep. 26, 2011; Ser. No. 61/537,279, filed Sep. 21, 2011; Ser. No. 61/513,745, filed Aug. 1, 2011; Ser. No. 61/511,738, filed Jul. 26, 2011; and/or Ser. No. 61/503,098, filed Jun. 30, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and/or 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170; and/or U.S. provisional applications, Ser. No. 61/513,745, filed Aug. 1, 2011; Ser. No. 61/511,738, filed Jul. 26, 2011; and/or Ser. No. 61/503,098, filed Jun. 30, 2011, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or U.S. Pat. No. 7,965,336 and/or U.S. Pat. No. 7,480,149, which are hereby incorporated herein by reference in their entireties. The imaging array sensor may comprise any suitable sensor, and may utilize various imaging sensors or imaging array sensors or cameras or the like, such as a pixelated imaging array sensor, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,965,336 and/or 7,720,580, and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. No. 6,396,397 and/or U.S. Pat. No. 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011, which is hereby incorporated herein by reference in its entirety).

Optionally, the video mirror display may be disposed rearward of and behind the reflective element assembly and may comprise a display such as the types disclosed in U.S. Pat. Nos. 7,855,755; 5,530,240; 6,329,925; 7,626,749; 7,581,859; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The display or displays may comprise a video display and may utilize aspects of the video display devices or modules described in U.S. Pat. Nos. 7,855,755; 6,690,268; 7,184,190; 7,274,501; 7,370,983 and/or 7,446,650, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle.

Changes and modifications in the specifically described embodiments may be carried out without departing from the principles of the present invention, which is intended to be limited only by the scope of the appended claims as interpreted according to the principles of patent law.

The invention claimed is:

1. A method of calibrating a vehicular camera, the method comprising:
    disposing a plurality of cameras at a vehicle so that the cameras have respective fields of view exterior the vehicle, wherein the plurality of cameras comprises at least (i) a front camera disposed at a front portion of the vehicle and having a field of view at least forward of the vehicle and (ii) a side camera disposed at a side portion of the vehicle and having a field of view at least sideward of the vehicle, and wherein the field of view of the front camera and the field of view of the side camera overlap at an overlapping region;
    capturing forward frames of image data via the front camera;
    providing an image processor for processing frames of image data captured by the cameras;
    providing captured forward frames of image data to the image processor;
    calibrating the front camera via processing by the image processor of forward frames of image data captured by the front camera;
    with the front camera calibrated, capturing a calibrated forward frame of image data by the front camera and capturing a sideward frame of image data by the side camera;
    providing the captured calibrated forward frame of image data and the captured sideward frame of image data to the image processor;
    determining, via processing by the image processor of the calibrated forward frame of image data, at least one feature present in the overlapping region of the calibrated forward frame of image data captured by the front camera;
    predicting pixel positions of the determined feature as would be captured by the side camera based on the location of the determined feature in the calibrated forward frame of image data captured by the front camera;
    locating, via processing by the image processor of the sideward frame of image data captured by the side camera, pixel positions of the determined feature in the sideward frame of image data captured by the side camera;
    determining misalignment of the side camera based at least in part on a comparison of the predicted pixel positions of the determined feature to the pixel positions of the determined feature in the sideward frame of image data captured by the side camera; and
    responsive to the determined misalignment of the side camera being greater than a threshold amount, adjusting processing by the image processor of sideward frames of image data captured by the side camera to accommodate the determined misalignment of the side camera.

2. The method of claim 1, wherein calibrating the front camera comprises processing forward frames of image data captured by the front camera to determine a vanishing point in the forward frames of image data captured by the front camera and comparing the determined vanishing point to a predetermined location in the forward frames of image data captured by the front camera.

3. The method of claim 1, wherein the side camera comprises a wide angle lens, and wherein the method comprises removing distortion in the location of the pixel positions in the sideward frame of image data for the determined feature caused by use of the wide angle camera lens of the side camera.

4. The method of claim 1, wherein the front camera comprises a wide angle lens, and wherein the method comprises removing distortion in locations of pixel positions in the calibrated forward frame of image data for the determined feature caused by use of the wide angle camera lens in the front camera.

5. The method of claim 1, wherein the side camera is disposed at an exterior side mirror of the vehicle.

6. The method of claim 1, wherein the plurality of cameras are part of a surround view vision system of the vehicle.

7. The method of claim 1, wherein the plurality of cameras further comprises a rearward viewing camera disposed at a rear portion of the vehicle.

8. The method of claim 1, wherein the side camera comprises one selected from the group consisting of (i) a driver-side camera disposed at a driver side of the vehicle and (ii) a passenger-side camera disposed at a passenger side of the vehicle.

9. The method of claim 8, wherein the method determines misalignment of the driver-side camera and the passenger-side camera.

10. A method of calibrating a vehicular camera, the method comprising:
    disposing a plurality of cameras at a vehicle so that the cameras have respective fields of view exterior the vehicle, wherein the plurality of cameras comprises at least (i) a rear camera disposed at a rear portion of the vehicle and having a field of view at least rearward of the vehicle and (ii) a side camera disposed at an exterior side mirror at a side portion of the vehicle and having a field of view at least sideward of the vehicle, and wherein the field of view of the rear camera and the field of view of the side camera overlap at an overlapping region;
    wherein the plurality of cameras are part of a surround view vision system of the vehicle;
    capturing rearward frames of image data via the rear camera;

providing an image processor for processing frames of image data captured by the cameras;

providing captured rearward frames of image data to the image processor;

calibrating the rear camera via processing by the image processor of rearward frames of image data captured by the rear camera;

with the rear camera calibrated, capturing a calibrated rearward frame of image data by the rear camera and capturing a sideward frame of image data by the side camera;

providing the captured calibrated rearward frame of image data and the captured sideward frame of image data to the image processor;

determining, via processing by the image processor of the calibrated rearward frame of image data, at least one feature present in the overlapping region of the calibrated rearward frame of image data captured by the rear camera;

predicting pixel positions of the determined feature as would be captured by the side camera based on the location of the determined feature in the calibrated rearward frame of image data captured by the rear camera;

locating, via processing by the image processor of the sideward frame of image data captured by the side camera, pixel positions of the determined feature in the sideward frame of image data captured by the side camera;

determining misalignment of the side camera based at least in part on a comparison of the predicted pixel positions of the determined feature to the pixel positions of the determined feature in the sideward frame of image data captured by the side camera; and responsive to the determined misalignment of the side camera being greater than a threshold amount, adjusting processing by the image processor of sideward frames of image data captured by the side camera to accommodate the determined misalignment of the side camera.

11. The method of claim 10, wherein calibrating the rear camera comprises processing rearward frames of image data captured by the rear camera to determine a vanishing point in the rearward frames of image data captured by the rear camera and comparing the determined vanishing point to a predetermined location in the rearward frames of image data captured by the rear camera.

12. The method of claim 10, wherein the side camera comprises a wide angle lens, and wherein the method comprises removing distortion in the location of the pixel positions in the sideward frame of image data for the determined feature caused by use of the wide angle camera lens of the side camera.

13. The method of claim 10, wherein the rear camera comprises a wide angle lens, and wherein the method comprises removing distortion in locations of pixel positions in the calibrated rearward frame of image data for the determined feature caused by use of the wide angle camera lens in the rear camera.

14. The method of claim 10, wherein the side camera comprises one selected from the group consisting of (i) a driver-side camera disposed at a driver side of the vehicle and (ii) a passenger-side camera disposed at a passenger side of the vehicle.

15. The method of claim 14, wherein the method determines misalignment of the driver-side camera and the passenger-side camera.

16. A method of calibrating a vehicular camera, the method comprising:

disposing a plurality of cameras at a vehicle so that the cameras have respective fields of view exterior the vehicle, wherein the plurality of cameras comprises at least (i) a front camera disposed at a front portion of the vehicle and having a field of view at least forward of the vehicle, (ii) a rear camera disposed at a rear portion of the vehicle and having a field of view at least rearward of the vehicle and (iii) side cameras disposed at respective side portions of the vehicle, and wherein the side cameras comprise (a) a driver-side camera disposed at a driver side portion of the vehicle and having a field of view at least sideward of the driver side portion of the vehicle and (b) a passenger-side camera disposed at a passenger side portion of the vehicle and having a field of view at least sideward of the passenger side portion of the vehicle;

wherein the plurality of cameras are part of a surround view vision system of the vehicle;

wherein the field of view of the front camera and the fields of view of the side cameras overlap at respective front overlapping regions, and wherein the field of view of the rear camera and the fields of view of the side cameras overlap at respective rear overlapping regions;

capturing forward frames of image data via the front camera and capturing rearward frames of image data via the rear camera as the vehicle is driven along a road;

providing an image processor for processing frames of image data captured by the cameras;

providing captured forward frames of image data and captured rearward frames of image data to the image processor;

calibrating the front camera via processing by the image processor of forward frames of image data captured by the front camera;

calibrating the rear camera via processing by the image processor of rearward frames of image data captured by the rear camera;

with the front camera calibrated, capturing a calibrated forward frame of image data by the front camera and capturing a sideward frame of image data by one of the side cameras;

providing the captured calibrated forward frame of image data and the captured sideward frame of image data to the image processor;

determining, via processing by the image processor of the calibrated forward frame of image data, at least one feature present in one of the front overlapping regions of the calibrated forward frame of image data captured by the front camera;

predicting pixel positions of the determined feature as would be captured by the respective side camera based on the location of the determined feature in the calibrated forward frame of image data captured by the front camera;

locating, via processing by the image processor of the sideward frame of image data captured by the respective side camera, pixel positions of the determined feature in the sideward frame of image data captured by the respective side camera;

determining misalignment of the respective side camera based at least in part on a comparison of the predicted pixel positions of the determined feature to the pixel positions of the determined feature in the sideward frame of image data captured by the respective side camera; and responsive to the determined misalignment of the respective side camera being greater than a threshold amount, adjusting processing by the image processor of sideward frames of image data captured by the respective side camera to accommodate the determined misalignment of the respective side camera.

17. The method of claim 16, wherein calibrating the front camera comprises processing forward frames of image data captured by the front camera to determine a vanishing point in the forward frames of image data captured by the front camera and comparing the determined vanishing point to a predetermined location in the forward frames of image data captured by the front camera.

18. The method of claim 16, wherein each of the side cameras comprises a wide angle lens, and wherein the method comprises removing distortion in the location of the pixel positions in the sideward frame of image data for the determined feature caused by use of the wide angle camera lens of the respective side camera.

19. The method of claim 16, wherein the front camera comprises a wide angle lens, and wherein the method comprises removing distortion in locations of pixel positions in the calibrated forward frame of image data for the determined feature caused by use of the wide angle camera lens in the front camera.

20. The method of claim 16, wherein the driver-side camera is disposed at a driver-side exterior side mirror at the driver side portion of the vehicle, and wherein the passenger-side camera is disposed at a passenger-side exterior side mirror at the passenger side portion of the vehicle.

21. The method of claim 16, wherein the method determines misalignment of the driver-side camera and the passenger-side camera.

* * * * *

UNITED STATES PATENT AND TRADEMARK OFFICE
CERTIFICATE OF CORRECTION

PATENT NO. : 10,919,458 B2
APPLICATION NO. : 15/929700
DATED : February 16, 2021
INVENTOR(S) : Nikhil Gupta et al.

Page 1 of 1

It is certified that error appears in the above-identified patent and that said Letters Patent is hereby corrected as shown below:

In the Specification

Column 15
Line 5, "Tin equation" should be --T in equation--
Line 15, "angle or IP is estimated." should be --angle or $\gamma$ is estimated--
Line 49, "Rz #0" should be --Rz ≠ 0--

Column 16
Line 56, "1701" should be --170I--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*